(12) United States Patent
Kim et al.

(10) Patent No.: US 11,349,594 B2
(45) Date of Patent: May 31, 2022

(54) DEVICE AND METHOD FOR GRANT-FREE COMMUNICATION IN WIRELESS COMMUNICATION SYSTEM

(71) Applicants: Samsung Electronics Co., Ltd., Suwon-si (KR); INDUSTRY-ACADEMIC COOPERATION FOUNDATION, YONSEI UNIVERSITY, Seoul (KR)

(72) Inventors: Chanhong Kim, Suwon-si (KR); Yeonghwan Kim, Seoul (KR); Chungyong Lee, Seoul (KR); Yonggue Han, Seoul (KR); Sungnam Hong, Suwon-si (KR)

(73) Assignees: Samsung Electronics Co., Ltd., Suwon-si (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 10 days.

(21) Appl. No.: 16/639,950

(22) PCT Filed: Aug. 17, 2018

(86) PCT No.: PCT/KR2018/009441
§ 371 (c)(1),
(2) Date: Feb. 18, 2020

(87) PCT Pub. No.: WO2019/035680
PCT Pub. Date: Feb. 21, 2019

(65) Prior Publication Data
US 2020/0252155 A1 Aug. 6, 2020

(30) Foreign Application Priority Data
Aug. 17, 2017 (KR) .................. 10-2017-0104166

(51) Int. Cl.
*H04L 1/00* (2006.01)
*H04W 72/04* (2009.01)
(Continued)

(52) U.S. Cl.
CPC .......... *H04L 1/0004* (2013.01); *H04L 5/0051* (2013.01); *H04L 5/0094* (2013.01);
(Continued)

(58) Field of Classification Search
CPC ... H04L 1/0004; H04L 5/0051; H04L 5/0094; H04L 72/042; H04L 72/04; H04L 72/02; H04W 76/11; H04W 76/27
(Continued)

(56) References Cited

U.S. PATENT DOCUMENTS 10,517,070 B2   12/2019  Seo et al.
2006/0046672 A1  3/2006  Kalhan et al.
(Continued)

FOREIGN PATENT DOCUMENTS

KR   10-2015-010243 A   10/2015
KR   10-2017-0082763 A   7/2017
WO      2016/068667 A1   5/2016

OTHER PUBLICATIONS

Gao et al.; Non-Redundant Precoding and PAPR Reduction in MIMO OFDM Systems with ICA Based Blind Equalization; IEEE Transactions on Wireless Communications; vol. 8, No. 6; University of Liverpool; Jun. 2009.
(Continued)

*Primary Examiner* — Candal Elpenord
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A method
(Continued)

of operating a terminal in a wireless communication system includes receiving control information for grant-free communication from a base station, generating a reference signal by using one sequence among sequences included in sequence set information for the reference signal included in the control information, and transmitting the reference signal and a data signal to the base station by using grant-free resource region information included in the control information. The one sequence may be used to allow the base station to identify the terminal.

20 Claims, 27 Drawing Sheets

(51) Int. Cl.
*H04L 5/00* (2006.01)
*H04W 76/11* (2018.01)
*H04W 76/27* (2018.01)
(52) U.S. Cl.
CPC .......... *H04W 72/042* (2013.01); *H04W 76/11* (2018.02); *H04W 76/27* (2018.02)
(58) Field of Classification Search
USPC ................................................ 370/329–330
See application file for complete search history.

(56) References Cited

U.S. PATENT DOCUMENTS

| | | | | |
|---|---|---|---|---|
| 2007/0211836 | A1 | 9/2007 | Chitrapu et al. | |
| 2013/0315342 | A1* | 11/2013 | Um | H04L 27/2613 375/295 |
| 2014/0254544 | A1 | 9/2014 | Kar Kin Au et al. | |
| 2016/0142981 | A1 | 5/2016 | Yi et al. | |
| 2017/0034845 | A1 | 2/2017 | Liu et al. | |
| 2017/0111147 | A1 | 4/2017 | Cao et al. | |
| 2018/0199359 | A1* | 7/2018 | Cao | H04W 72/1289 |
| 2018/0199381 | A1* | 7/2018 | Rong | H04W 72/0413 |
| 2018/0288746 | A1* | 10/2018 | Zhang | H04L 1/0031 |
| 2018/0295651 | A1* | 10/2018 | Cao | H04W 72/042 |
| 2019/0150190 | A1* | 5/2019 | Kim | H04W 56/00 370/329 |
| 2019/0319762 | A1* | 10/2019 | Zhang | H04L 5/0091 |
| 2020/0008204 | A1* | 1/2020 | Matsumura | H04W 72/0466 |
| 2020/0092910 | A1* | 3/2020 | Takeda | H04L 1/08 |
| 2020/0107301 | A1* | 4/2020 | Chen | H04L 1/1671 |
| 2021/0289539 | A1* | 9/2021 | Byun | H04W 72/1263 |

OTHER PUBLICATIONS

Ding et al.; HOS-Based Semi-Blind Spatial Equalization for MIMO Rayleigh Fading Channels; IEEE Transactions on Signal Processing; vol. 56, No. 1; Jan. 2008.
Jagannatham et al.; Whitening-Rotation-Based Semi-Blind MIMO Channel Estimation; IEEE Transactions on Signal Processing; vol. 54, No. 3; Mar. 2006.
Au et al.; Uplink Contention Based SCMA for 5G Radio Access; Huawei Technologies Canada Co., LTD.; Ottawa, Ontario, Canada; 2014.
Wang et al.; Compressive Sensing Based Multi-User Detection for Uplink Grant-Free Non-Orthogonal Multiple Access; Tsinghua National Laboratory for Information Science and Technology (TNList); Department of Electronic Engineering, Tsinghua University; ZTE Corporation; IEEF; 2015; Beijing, China.
Bayesteh et al.; Blind Detection of SCMA for Uplink Grant-Free Multiple-Access; Huawei Technologies Canada Co. Ltd.; IEEE; 2014; Ottawa, Ontario, Canada.
Papadias; Globally Convergent Blind Source Separation Based on a Multiuser Kurtosis Maximization Criterion; IEEE Transactions on Signal Processing; vol. 48, No. 12; Dec. 2000.
LG Electronics; Discussion on grant-based and grant-free UL transmissions for latency; 3GPP TSG RAN WG1 Meeting #88; R1-1702490; Feb. 13-17, 2017; Athens, Greece.
Samsung; On grant-free UL transmissions for URLLC; 3GPP TSG RAN WG1 Meeting #88; R1-1702996; Feb. 13-17, 2017; Athens, Greece.
Korean Office Action dated Mar. 30, 2021, issued in Korean Application No. 10-2017-0104166.
Intel Corporation, Grant-free UL transmission scheduling and HARQ aspects, 3GPP TSG RAN1 WG Meeting #88bis R1-1704762, Spokane, USA Apr. 3-7, 2017.
Korean Office Action dated Oct. 6, 2021, issued in Korean Application No. 10-2017-0104166.
Notice of Patent Grant dated April 15, 2022, issued in Korean Application No. 10-2017-0104166.

* cited by examiner

DEVICE AND METHOD FOR GRANT-FREE COMMUNICATION IN WIRELESS COMMUNICATION SYSTEM

TECHNICAL FIELD

The present disclosure relates in general to a wireless communication system, and in particular, to an apparatus and method for grant-free communication in the wireless communication system.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

There are ongoing discussions on various types of transmission methods in a 5G system. For example, a grant-free transmission method has been proposed to transmit data without a grant in uplink transmission. Further, various discussions are underway to more efficiently support grant-free communication.

DISCLOSURE OF INVENTION

Technical Problem

On the basis of the aforementioned discussion, the present disclosure provides an apparatus and method for efficiently supporting grant-free communication in a wireless communication system.

In addition, the present disclosure provides an apparatus and method for selecting a temporary IDentification (ID) for grant-free communication by using a sequence of a reference signal in a wireless communication system.

In addition, the present disclosure provides an apparatus and method for identifying a terminal for performing grant-free communication by using a sequence of a reference signal in a wireless communication system.

In addition, the present disclosure provides an apparatus and method for estimating a grant-free terminal group for transmitting a signal in a wireless communication system.

In addition, the present disclosure provides an apparatus and method for determining at least one subframe corresponding to a case where there is no change in a grant-free terminal group for transmitting a signal in a wireless communication system as an Independent Component Analysis (ICA) execution region.

Solution to Problem

According to various embodiments of the present disclosure, a method of operating a terminal in a wireless communication system may include receiving control information for grant-free communication from a base station, generating a reference signal by using one sequence among sequences included in sequence set information for the reference signal included in the control information, and transmitting the reference signal and a data signal to the base station by using grant-free resource region information included in the control information. The one sequence may be used to allow the base station to identify the terminal.

According to various embodiments of the present disclosure, a method of operating a base station in a wireless communication system may include transmitting control information for grant-free communication to a terminal, receiving a reference signal and a data signal through a resource for the grant-free communication from the terminal, and decoding the reference signal and the data signal upon identifying the terminal on the basis of the reference signal. The reference signal may be generated by using the sequence among sequences included in sequence set information for the reference signal included in the control information.

According to various embodiments of the present disclosure, a terminal apparatus in a wireless communication system may include at least one transceiver, and at least one processor operatively coupled to the at least one transceiver. The at least one processor may be configured to receive control information for grant-free communication from a base station, generate a reference signal by using one sequence among sequences included in sequence set information for the reference signal included in the control information, and transmit the reference signal and a data signal to the base station by using grant-free resource region information included in the control information. The sequence may be used to allow the base station to identify the terminal.

According to various embodiments of the present disclosure, a base station apparatus in a wireless communication system may include at least one transceiver, and at least one processor operatively coupled to the at least one transceiver. The at least one processor may be configured to transmit control information for grant-free communication to a terminal, receive a reference signal and a data signal through a resource for the grant-free communication from the terminal, and decode the reference signal and the data signal upon identifying the terminal on the basis of the reference signal. The reference signal may be generated by using the sequence among sequences included in sequence set information for the reference signal included in the control information.

Advantageous Effects of Invention

An apparatus and method according to various embodiments of the present disclosure identify a terminal by using a sequence of a reference signal, thereby effectively supporting grant-free communication.

Advantages acquired in the present disclosure are not limited to the aforementioned advantages. Other advantages not mentioned herein can be clearly understood by those skilled in the art to which the present disclosure pertains from the following descriptions.

BEST MODE FOR CARRYING OUT THE INVENTION

Terms used in the present disclosure are for the purpose of describing particular embodiments only and are not intended to limit other embodiments. A singular expression may include a plural expression unless there is a contextually distinctive difference. Unless otherwise defined, all terms (including technical and scientific terms) used herein have the same meaning as commonly understood by those ordinarily skilled in the art disclosed in the present disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the present disclosure should not be interpreted to exclude the embodiments of the present disclosure.

A hardware-based approach is described for example in the various embodiments of the present disclosure described hereinafter. However, since the various embodiments of the present disclosure include a technique in which hardware and software are both used, a software-based approach is not excluded in the embodiments of the present disclosure.

Hereinafter, the present disclosure relates to an apparatus and method for grant-free communication in a wireless communication system. Specifically, the present disclosure describes a technique for performing grant-free communication by using an Independent Component Analysis (ICA)

scheme in response to identifying a terminal according to a sequence of a reference signal in the wireless communication system.

Terms used hereinafter to refer to a resource (e.g., a grant-free resource region, a subframe group), network entities, a constitutional element of a device (properly modified according to the disclosure), or the like are exemplified for convenience of explanation. Therefore, the present disclosure is not limited to the terms described below, and thus other terms have the same technical meaning may also be used.

In addition, although the present disclosure also describes various embodiments by using terms used in some communication standards (e.g., 3rd Generation Partnership Project (3GPP)), this is for exemplary purposes only. Various embodiments of the present disclosure may be easily modified, and thus may also be applied to other communication systems.

Figure 1:
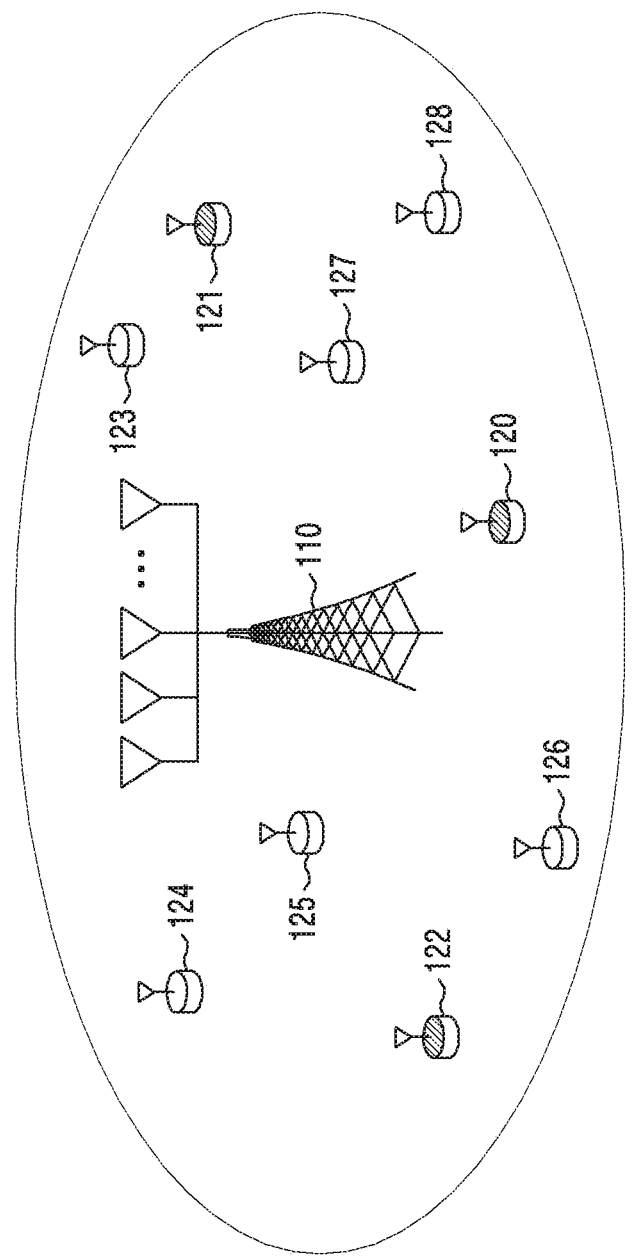
FIG. 1 illustrates a wireless communication system according to various embodiments of the present disclosure.

FIG. 1 illustrates a wireless communication system according to various embodiments of the present disclosure. As part of nodes which use a wireless channel in a wireless communication system, a base station 110 and a plurality of terminals 120 to 128 are exemplified in FIG. 1. Although only one base station is exemplified in FIG. 1, another base station identical to or different from the base station 110 may be further included. In addition, although 10 terminals are exemplified in FIG. 1, the number of terminals may be less than or greater than 10.

The base station 110 is a network infrastructure which provides a radio access to the terminals 120 to 128. The base station 110 has a coverage defined as a specific geographic region on the basis of a distance in which a signal can be transmitted. In addition to the term 'base station', the base station 110 may be referred to as an 'Access Point (AP)', an 'eNodeB (eNB)', a '5$^{th}$ Generation (5G) node', a 'wireless point', a 'Transmission/Reception Point (TRP)', or other terms having equivalent technical meanings.

As a device used by a user, the terminals 120 to 128 communicate with the base station 110. Optionally, at least one of the terminals 120 to 128 may be operated without user involvement. For example, as a device for performing massive Machine Type Communication (mMTC), the terminals 120 to 128 may not be carried by the user. In addition to the term 'terminal', the terminals 120 to 128 may be referred to as a 'User Equipment (UE)', a 'mobile station', a 'subscriber station', a 'remote terminal', a 'wireless terminal', a 'user device', or other terms having equivalent technical meanings.

Some terminals 120 to 122 among the terminals 120 to 128 may simultaneously transmit a signal to the base station 110 by using grant-free communication. Accordingly, the base station 110 may decode a reception signal by using an ICA scheme. Herein, the ICA scheme may imply a process of separating a transmission signal by using a statistical feature of the reception signal without channel estimation.

Figure 2:
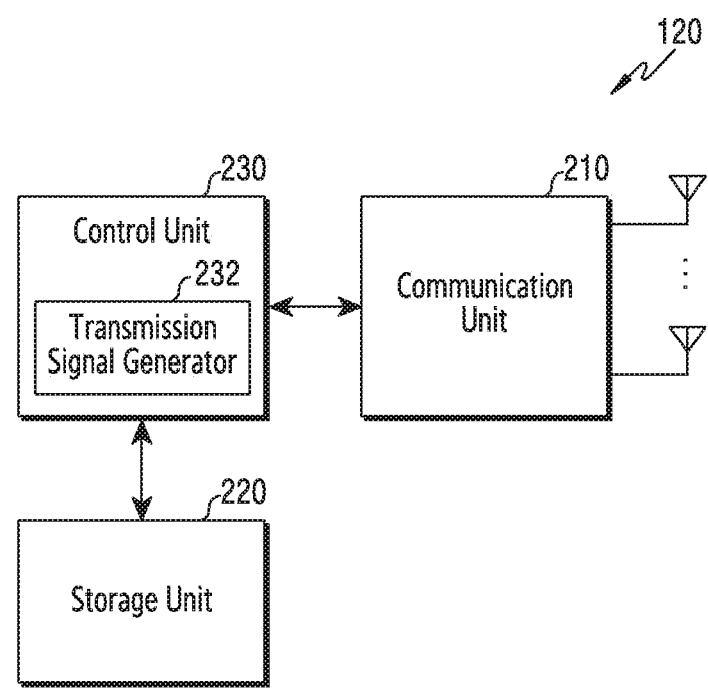
FIG. 2 illustrates a structure of a terminal in a wireless communication system according to various embodiments of the present disclosure.

FIG. 2 illustrates a structure of a terminal in a wireless communication system according to various embodiments of the present disclosure. The structure exemplified in FIG. 2 may be understood as a structure of any one of the terminals 120 to 128, and hereinafter, the terminal 120 is described representatively. Hereinafter, the term '... unit', '... device', or the like implies a unit of processing at least one function or operation, and may be implemented in hardware or software or in combination of the hardware and the software.

Referring to FIG. 2, the terminal 120 includes a communication unit 210, a storage unit 220, and a control unit 230.

The communication unit 210 performs functions for transmitting/receiving a signal through a wireless channel. For example, the communication unit 210 may perform a function of conversion between a baseband signal and a bit-stream according to a physical layer standard of a system. For example, in data transmission, the communication unit 210 generates complex symbols by coding and modulating a transmission bit-stream. In addition, in data reception, the communication unit 210 restores a reception bit-stream by demodulating and decoding a baseband signal. In addition, the communication unit 210 up-converts a baseband signal into a Radio Frequency (RF) signal and thereafter transmits it through an antenna, and down-converts an RF signal received through the antenna into a baseband signal. For example, the communication unit 210 may include a transmission filter, a reception filter, an amplifier, a mixer, an oscillator, a Digital to Analog Converter (DAC), an Analog to Digital Converter (ADC), or the like.

In addition, the communication unit 210 may include a plurality of transmission/reception paths. Further, the communication unit 210 may include at least one antenna array constructed of a plurality of antenna elements. From a hardware aspect, the communication unit 210 may be constructed of a digital circuit and an analog circuit (e.g., a Radio Frequency Integrated Circuit (RFIC)). Herein, the digital circuit and the analog circuit may be implemented as one packet. In addition, the communication unit 210 may include a plurality of RF chains. Further, the communication unit 210 may perform beamforming.

The communication unit 210 transmits and receives a signal as described above. Accordingly, the communication unit 210 may be referred to as a transmitter, a receiver, or a transceiver. In addition, in the following description, transmission and reception performed through a wireless channel are used to imply that the aforementioned processing is performed by the communication unit 210.

The storage unit 220 stores data such as a basic program, application program, configuration information, or the like for an operation of the terminal 120. The storage unit 220 may be constructed of a volatile memory, a non-volatile memory, or a combination of the volatile memory and the non-volatile memory. According to various embodiments, the storage unit 220 may store a basic codebook. The basic codebook is at least one codebook related to a data symbol, and may be used to generate another codebook related to a reference signal. In addition, the storage unit 220 provides stored data according to a request of the control unit 230.

The control unit 230 controls overall operations of the terminal 120. For example, the control unit 230 may transmit and receive a signal via the communication unit 210. In addition, the control unit 230 writes data to the storage unit 220, and reads the data. In addition, the control unit 230 may perform functions of a protocol stack required in a communication standard. For this, the control unit 230 may include at least one processor or micro-processor, or may be part of the processor. In addition, part of the communication unit 210 and the control unit 230 may be referred to as a Communication Processor (CP). In particular, according to various embodiments, the control unit 230 controls the terminal 120 to perform uplink transmission having a grant-free attribute. For example, the control unit 230 may include a transmission signal generator 232. The transmission signal generator 232 may generate a transmission signal including a reference signal and a data signal.

According to various embodiments, the control unit 230 may provide control to generate and transmit the reference signal and the data signal by using control information for grant-free communication. For example, the control unit 230 may control the terminal 120 to perform operations based on various embodiments described below.

Figure 3A:
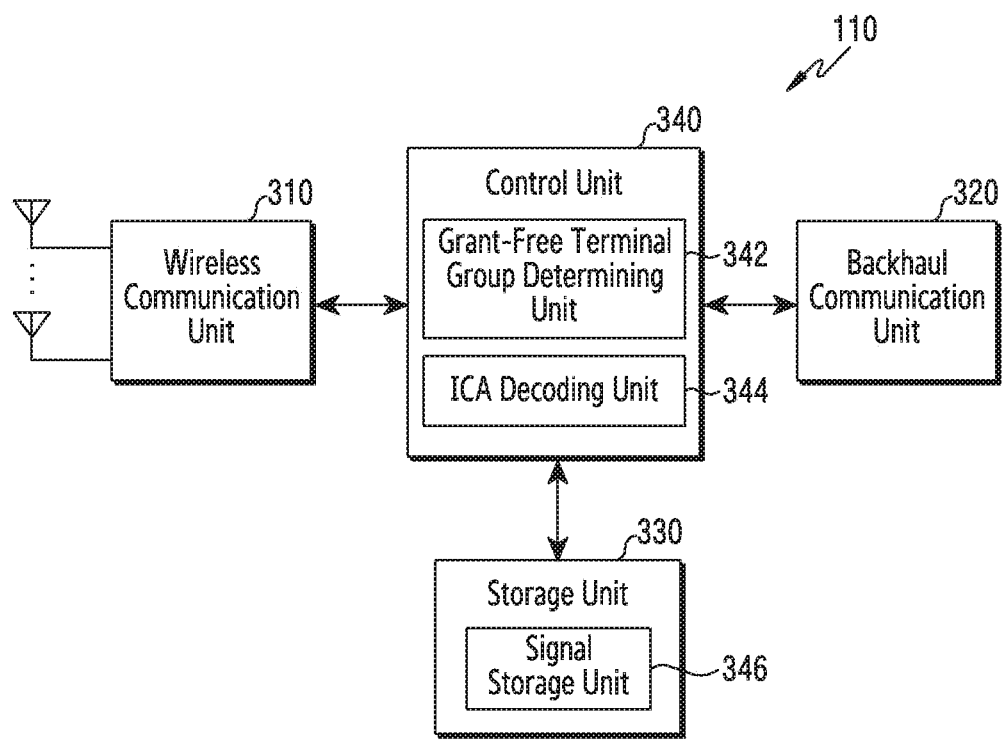
FIG. 3A illustrates a structure of a base station in a wireless communication system according to various embodiments of the present disclosure.

FIG. 3A illustrates a structure of a base station in a wireless communication system according to various embodiments of the present disclosure. The structure exemplified in FIG. 3A may be understood as a structure of the first base station 110. Hereinafter, the term ' . . . unit', ' . . . device', or the like implies a unit of processing at least one function or operation, and may be implemented in hardware or software or in combination of the hardware and the software.

Referring to FIG. 3A, the base station 110 includes a wireless communication unit 310, a backhaul communication unit 320, a storage unit 330, and a control unit 340.

The wireless communication unit 310 performs functions for transmitting and receiving a signal through a wireless channel. For example, the wireless communication unit 310 performs a function of conversion between a baseband signal and a bit-stream according to a physical layer standard of a system. For example, in data transmission, the wireless communication unit 310 generates complex symbols by coding and modulating a transmission bit-stream. In addition, in data reception, the wireless communication unit 310 restores a reception bit-stream by demodulating and decoding a baseband signal. In addition, the wireless communication unit 310 up-converts a baseband signal into a Radio Frequency (RF) signal and thereafter transmits it through an antenna, and down-converts an RF signal received through the antenna into a baseband signal.

For this, the wireless communication unit 310 may include a transmission filter, a reception filter, an amplifier, a mixer, an oscillator, a Digital to Analog Converter (DAC), an Analog to Digital Converter (ADC), or the like. In addition, the wireless communication unit 310 may include a plurality of transmission/reception paths. Further, the wireless communication unit 310 may include at least one antenna array constructed of a plurality of antenna elements. From a hardware aspect, the wireless communication unit 310 may be constructed of a digital unit and an analog unit, and the analog unit may be constructed of a plurality of sub-units according to operating power, operation frequency, or the like.

The wireless communication unit 310 transmits and receives a signal as described above. Accordingly, the wireless communication unit 310 may be referred to as a transmitter, a receiver, or a transceiver. In addition, in the following description, transmission and reception performed through a wireless channel are used to imply that the aforementioned processing is performed by the wireless communication unit 310.

The backhaul communication unit 320 provides an interface for preforming communication with different nodes in a network. That is, the backhaul communication unit 320 converts a bit-stream transmitted from the base station 110 to a different node, e.g., a different access node, a different base station, an upper node, a core network, or the like, into a physical signal, and converts a physical signal received from the different node into a bit-stream.

The storage unit 330 stores data such as a basic program, application program, configuration information, or the like for an operation of the base station 110. The storage unit 330 may be constructed of a volatile memory, a non-volatile memory, or a combination of the volatile memory and the non-volatile memory. The storage unit 330 may include a signal storage unit 346. The signal storage unit 346 may store a corresponding reception signal when there is no change in a grant-free terminal group to perform decoding by using an ICA scheme. In addition, the storage unit 330 provides stored data according to a request of the control unit 340.

The control unit 340 controls overall operations of the base station 110. For example, the control unit 230 may transmit and receive a signal via the wireless communication unit 310 or the backhaul communication unit 320. In addition, the control unit 340 writes data to the storage unit 330, and reads the data. In addition, the control unit 340 may perform functions of a protocol stack required in a communication standard. For this, the control unit 340 may include at least one processor. According to various embodiments, the control unit 340 may include a grant-free terminal group determining unit 342 and an ICA decoding unit 344. The grant-free terminal group determining unit 342 may determine the number of terminals included in a grant-free terminal group by using an eigenvalue of a reception signal.

Figure 3B:
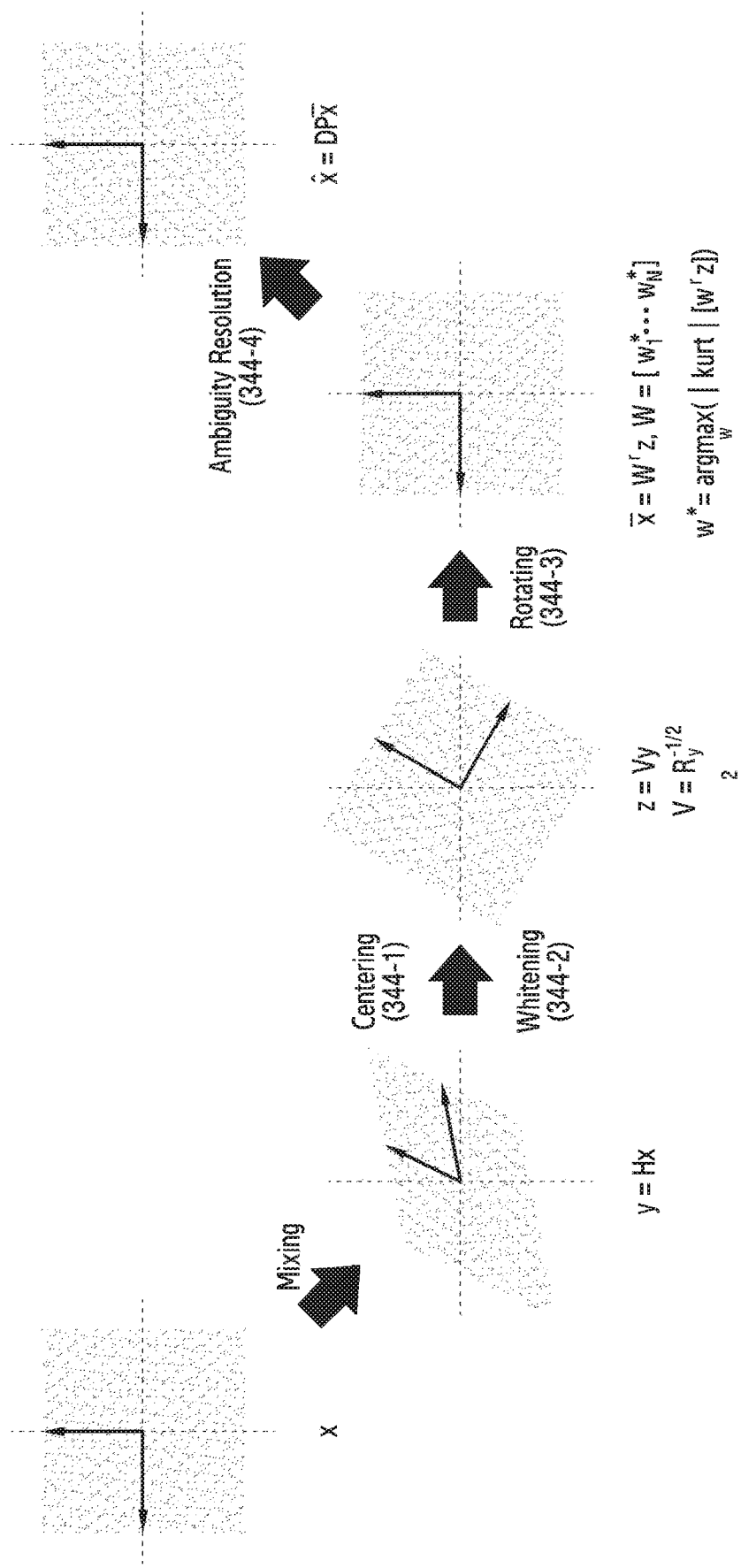
FIG. 3B illustrates an example of Independent Component Analysis (ICA) decoding in a wireless communication system according to various embodiments of the present disclosure.

The ICA decoding unit 344 may detect transmission signals from reception signals by using the ICA scheme. In this case, the transmission signals may be independent of each other, and may have a non-Gaussian distribution. That is, since the transmission symbols may be an Identically Independent Distributed (IID) random variable having the non-Gaussian distribution, the ICA decoding unit 344 may separate the transmission signals. Specifically, referring to FIG. 3B, the ICA decoding unit 344 may perform a centering operation 344-1, a whitening operation 344-2, a rotating operation 344-3, and an ambiguity resolving operation 344-4 for the reception signal.

According to the centering operation 344-1, the ICA decoding unit 344 may process reception signals such that an average of the reception signals is 0. In some embodiments, a condition of Equation (1) below may be satisfied by the centering operation 344-1.

$$E\{y\}=0 \qquad (1)$$

Herein, y denotes a reception signal, and E denotes an average operation. In some embodiments, the centering operation 344-1 may be omitted.

According to the whitening operation 344-2, the ICA decoding unit 344 may modify a reception signal such that a covariance matrix of the modified reception signal is an identity matrix. That is, the ICA decoding unit 344 may separate the reception signal as an uncorrelated signal by using a covariance which is a secondary statistical feature of the reception signal. In some embodiment, a whitened reception signal may satisfy a condition of Equation (2) below.

$$E\{zz^T\}=I$$

$$z=Vy \qquad (2)$$

Herein, z denotes a whitened reception signal, I denotes an identity matrix, y denotes a reception signal, and V denotes a matrix processed by the reception signal in the whitening operation 344-2.

According to the rotating operation 344-3, the ICA decoding unit 344 may separate a transmission signal by rotating an axis of the signal. That is, the rotating operation 344-3 may imply a procedure of processing a whitened signal to maximize a non-Gaussianity feature by using a kurtosis which is a quaternary statistical feature. In some embodiments, the rotated signal may be determined by Equation (3) below.

$$\bar{x} = W^T z, W = [w_1^* \ldots w_N^*] \quad (3)$$

$$w^* = \underset{w}{\mathrm{argmax}}(|kurt[w^T z]|)$$

Herein, $\bar{x}$ denotes a rotated reception signal, w denotes a weight vector for rotating, and z denotes a whitened reception signal.

According to the ambiguity resolving operation 344-4, the ICA decoding unit 344 may resolve a permutation ambiguity problem and a phase ambiguity problem. In this case, the permutation ambiguity problem and the phase ambiguity problem may be expressed by Equation (4) below.

$$\begin{aligned} y &= Hx \quad (4) \\ &= \left(\frac{1}{\alpha}H\right) \cdot (\alpha x), |\alpha| = 1 \\ &= (HP^{-1}) \cdot (Px), P\text{: Permutation matrix} \end{aligned}$$

Herein, y denotes a reception signal, H denotes a channel, x denotes a transmission signal, α denotes a constant, and P denotes a permutation matrix. In this case, the permutation ambiguity problem is a problem in that a transmission signal transmitted by the terminal 120 is incorrectly specified as a transmission signal transmitted by the terminal 121 since the estimated transmission signal may be $[x_1 x_2 x_3]^T$ or $[x_2 x_3 x_1]^T$ when a signal transmitted by the terminals 120 to 122 is $x=[x_1 x_2 x_3]^T$. Accordingly, the ICA decoding unit 344 may compare a sequence of a reference signal included in the estimated transmission signal and a sequence of a reference signal agreed between the base station 110 and the terminals to specify a terminal by which the transmission signal is transmitted. The phase ambiguity problem is a problem in that whether the estimated transmission signal is x or αx cannot be specified by using the ICA scheme. Accordingly, the ICA decoding unit 344 may calculate and compensate for an error by comparing the sequence of the reference signal included in the estimated transmission signal and the sequence of the reference signal agreed between the base station 110 and the terminals, thereby resolving the phase ambiguity problem. For example, if the sequence of the reference signal included in the estimated transmission signal is [−0.8 −1.1] and the sequence of the reference signal included in the transmission signal is [1 1], the base station 110 may calculate that an error is multiplied by −0.9 to estimate a correct transmission signal by dividing the estimated transmission signal by −0.9. In some embodiments, the ambiguity problem may be resolved and thus a finally estimated transmission signal may be determined by Equation (5) below.

$$\hat{x} = DP\bar{x} \quad (5)$$

Herein, $\hat{x}$ denotes a finally estimated reception signal, and $\bar{x}$ denotes a rotated reception signal. In addition, D denotes a diagonal matrix as a matrix which expresses phase ambiguity. Each element denotes a constant value (e.g., a phase-shifted level) multiplied by the transmission signal estimated by the base station 110 against a transmission signal transmitted by the terminal 120. P denotes a permutation matrix (e.g., a matrix in which one element of 1 exists in each row and column and the remaining elements are 0) as a matrix expressing permutation ambiguity, and may indicate how an order of a transmission signal transmitted by the terminal 120 is changed after estimation.

In some embodiments, as an instruction set or code stored in the storage unit 330, the grant-free terminal group determining unit 342 and the ICA decoding unit 344 may be a storage space in which the instruction/code is stored as an instruction/code temporarily resided in the control unit 340, or may be part of a circuitry which constitutes the control unit 340. For example, the control unit 340 may control the base station 110 to perform operations according to various embodiments described below.

According to various embodiments of the present disclosure, a method of operating a grant-free resource region for performing grant-free communication without being subjected to an additional random access process and a connection setup process may be provided by two scenarios as described below.

Figure 4A:
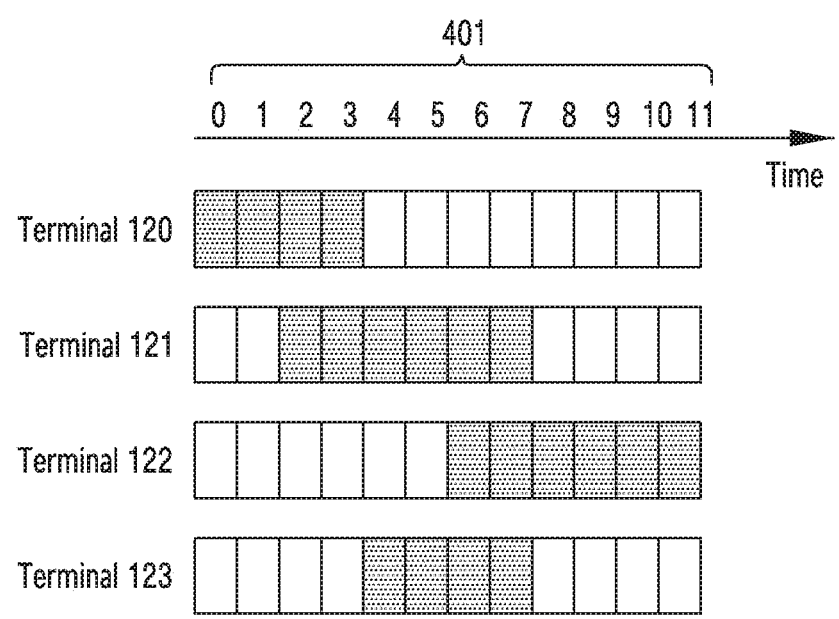
FIG. 4A illustrates an example of operating a grant-free resource region on the basis of a first scenario in a wireless communication system according to various embodiments of the present disclosure.

FIG. 4A illustrates an example of operating a grant-free resource region on the basis of a first scenario in a wireless communication system according to various embodiments of the present disclosure.

Referring to FIG. 4A, according to the first scenario, the base station 110 may allocate a transmission repetition count for grant-free communication to each terminal. Accordingly, each terminal may transmit a reference signal and a data signal in any subframe of a grant-free resource region to the base station 110 on the basis of the transmission repetition count allocated to the terminal. For example, the terminal 120 to which a transmission repetition count of 4 is allocated may transmit the reference signal and the data signal 4 times respectively through subframes 0, 1, 2, and 3 of a grant-free resource region 401. For another example, the terminal 121 to which a transmission repetition count of 6 is allocated may transmit the reference signal and the data signal 6 times respectively through subframes 2, 3, 4, 5, 6, and 7 of the grant-free resource region 401.

Figure 4B:
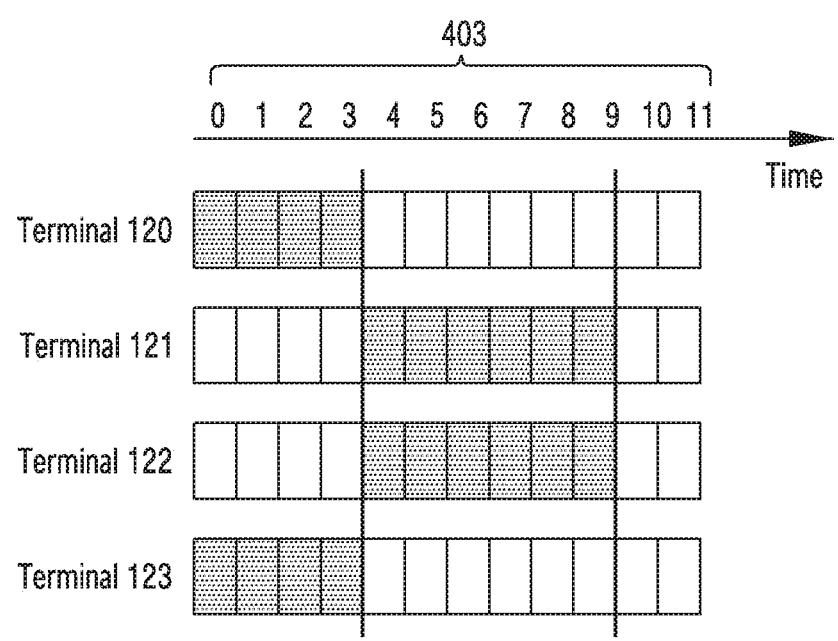
FIG. 4B illustrates an example of operating a grant-free resource region on the basis of a second scenario in a wireless communication system according to various embodiments of the present disclosure.

FIG. 4B illustrates an example of operating a grant-free resource region on the basis of a second scenario in a wireless communication system according to various embodiments of the present disclosure.

Referring to FIG. 4B, according to the second scenario, the base station 110 may group terminals to which the same transmission repetition count is allocated. In some embodiments, the base station 110 may restrict simultaneous access of terminals having high channel correlation in grant-free communication by classifying the terminals having high channel correlation into different groups. That is, since there is a high probability that channel correlation between adjacent terminals is high according to a feature of a massive Machine Type Communication (mMTC) having a small change in a location and channel of each terminal, the base station 110 may divide regions to classify terminals of the respective regions to different groups. In addition, the base station 110 may allocate a subframe group of the grant-free resource region for each terminal group. Herein, the subframe group may imply at least one subframe of the grant-free resource region grouped according to the transmission repetition count. Accordingly, terminals included in each terminal group may transmit a reference signal and a data signal to the base station by using the subframe group. For example, the terminals 120 and 123 to which a transmission repetition count of 4 is allocated equally may be classified to a first terminal group, and a first subframe group including subframes 0, 1, 2, and 3 may be allocated thereto. Accordingly, each of the terminals 120 and 123 may transmit a reference signal and a data signal 4 times through the first subframe group. For another example, the terminals 121 and 122 to which a transmission repetition count of 6 is allocated equally may be classified to a second terminal group, and a second subframe group including subframes 4, 5, 6, 7, 8, and 9 may be allocated thereto. Accordingly, each of the terminals 121 and 122 may transmit the reference signal and the data signal 6 times through the second subframe group.

As described above, the method of operating a grant-free resource region according to various embodiment of the present disclosure may be provided as two scenarios. Accordingly, the following descriptions include: i) a process of receiving control information for grant-free communication; ii) a process of generating and transmitting a reference signal; iii) a process of determining a grant-free terminal group; and iv) an ICA decoding process based on an ICA execution region.

Figure 5:
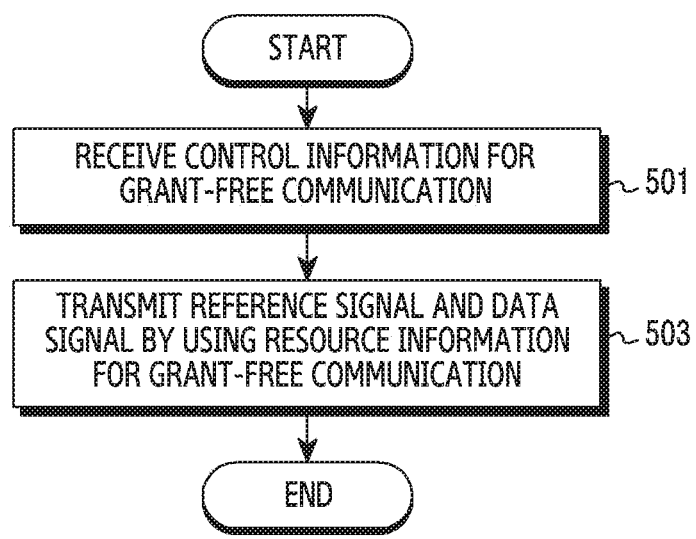
FIG. 5 is a flowchart of a terminal in a wireless communication system according to various embodiments of the present disclosure.

FIG. 5 is a flowchart of a terminal in a wireless communication system according to various embodiments of the present disclosure. A method of operating the terminal 120 is exemplified in FIG. 5.

Referring to FIG. 5, in step 501, the terminal receives control information for grant-free communication from a base station (e.g., the base station 110). Specifically, according to a first scenario, the control information for grant-free communication may include at least one of sequence set information of a reference signal, an IDentification (ID) of the terminal in a cell, transmission repetition count information, Modulation and Coding Scheme (MCS) level information, subcarrier spacing information, subcarrier count information, and grant-free resource region information. For example, the sequence set information may imply information for indicating sequences of a reference signal for selecting a temporary ID of the terminal for grant-free communication. For another example, the sequence set information may imply information for indicating a mapping relation between a sequence of each reference signal and an index of a corresponding reference signal. Herein, the index of the reference signal may be used as the temporary ID of the terminal for grant-free communication. According to a second scenario, the control information for grant-free communication may include at least one of index information of a terminal group to which the terminal belongs, an ID of the terminal in a cell, transmission repetition count information, MCS level information, subcarrier spacing information, subcarrier count information, and subframe group information. In some embodiments, step 501 of FIG. 5 may be omitted. For example, the step 501 of FIG. 5 may be performed when the terminal first performs initial access to a base station, and upon completion of the initial access, the step 501 of FIG. 5 may be omitted.

In step S503, the terminal transmits a reference signal and a data signal to the base station. Specifically, first, the terminal may generate the reference signal. In this case, according to the first scenario, the reference signal may include a reference signal of a first type and a reference signal of a second type. The reference signal of the first type may imply a reference signal of which a length of a sequence is equal to the number of sequences. The reference signal of the second type may imply a reference signal of which a length of a sequence is greater than the number of sequences. According to the second scenario, the reference signal may have a sequence length for determining an error of a sequence of a reference signal pre-agreed between the terminal and the base station, that is, a sequence of a reference signal included in a transmission signal and a sequence of a reference signal estimated using an ICA scheme. Thereafter, the terminal may transmit the generated reference signal and data signal. In this case, according to the first scenario, the terminal may transmit the reference signal and the data signal by using any subframes in a grant-free resource region on the basis of a transmission repetition count allocated to the terminal. According to the second scenario, the terminal may transmit the reference signal and the data signal by using a subframe group on the basis of a transmission repetition count of a grant-free resource region.

Figure 6:
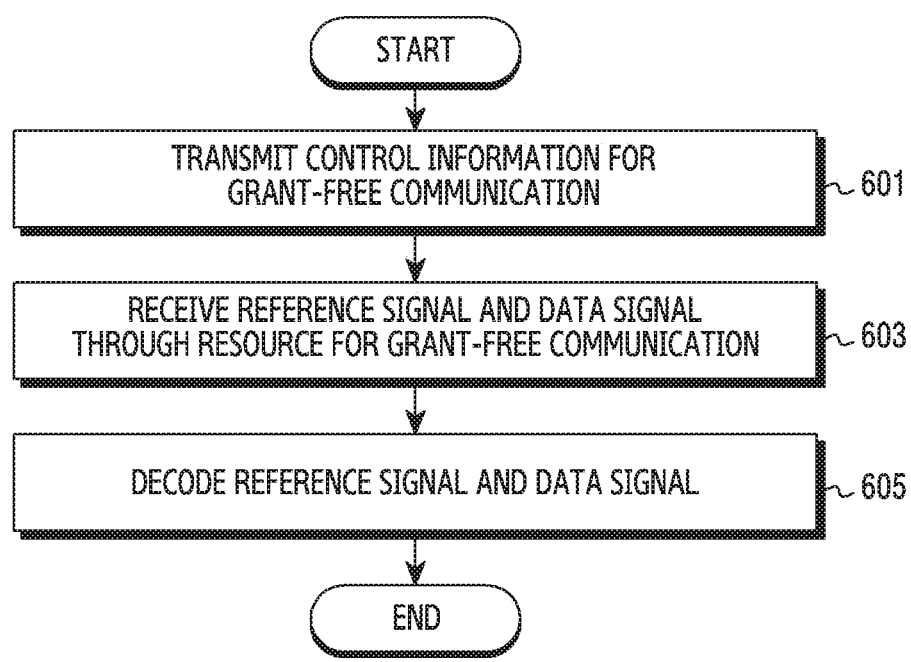
FIG. 6 is a flowchart of a base station in a wireless communication system according to various embodiments of the present disclosure.

FIG. 6 is a flowchart of a base station in a wireless communication system according to various embodiments of the present disclosure. A method of operating the base station 110 is exemplified in FIG. 6.

Referring to FIG. 6, in step 601, the base station transmits control information for grant-free communication to a terminal (e.g., the terminal 120). Specifically, according to a first scenario, control information for grant-free communication may include at least one of sequence set information of a reference signal, an ID of the terminal in a cell, transmission repetition count information, MCS level information, subcarrier spacing information, subcarrier count information, and grant-free resource region information. According to a second scenario, the control information for grant-free communication may include at least one of index information of a terminal group to which the terminal belongs, an ID of the terminal in a cell, transmission repetition count information, MCS level information, subcarrier spacing information, subcarrier count information, and subframe group information. In some embodiments, step 601 of FIG. 6 may be omitted. For example, the step 601 of FIG. 6 may be performed when the terminal first performs initial access to the base station, and upon completion of the initial access, the step 601 of FIG. 6 may be omitted.

In step 603, the base station receives a reference signal and a data signal from the terminal through a resource for grant-free communication. Specifically, according to the first scenario, the base station may receive the reference signal and the data signal through any subframe in a grant-free resource region on the basis of a transmission repetition count allocated to the terminal. According to the second scenario, the base station may receive the reference signal and the data signal through a subframe group on the basis of the transmission repetition count in the grant-free resource region.

In step 605, the base station decodes the reference signal and the data signal. Specifically, first, the base station may determine whether there is a change in a grant-free terminal group. Herein, the grant-free terminal group may include at least one terminal which transmits a reference signal and a data signal by using a specific subframe or a specific subframe group of the grant-free resource region. In this case, according to the first scenario, the base station may determine whether a grant-free terminal group is changed in each subframe. According to the second scenario, the base station may determine whether the grant-free terminal group is changed in each subframe. Thereafter, the base station may decode the data signal. In this case, according to the first scenario, the base station may decode a reference signal and data signal for at least one corresponding subframe when the number of terminals included in the grant-free terminal group is identical. According to the second scenario, the base station may decode the reference signal and data signal for the subframe group.

Figure 7:
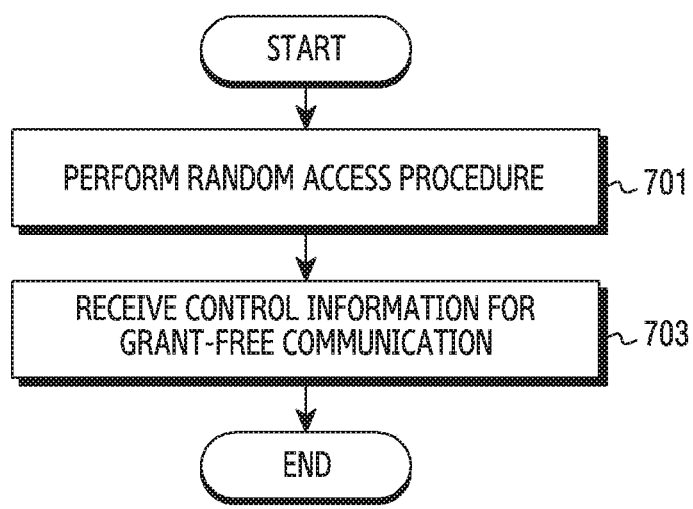
FIG. 7 is a flowchart of a terminal for receiving control information for grant-free communication in a wireless communication system in greater detail according to various embodiments of the present disclosure.

FIG. 7 is a flowchart of a terminal for receiving control information for grant-free communication in a wireless communication system in greater detail according to various embodiments of the present disclosure. A method of operating the terminal 120 is exemplified in FIG. 7.

Referring to FIG. 7, in step 701, the terminal performs an initial access procedure with respect to a base station (e.g., the base station 110). Specifically, the base station may gradually increase transmission power, and may broadcast an initial access request. This is to reduce a collision between terminals simultaneously accessing the base station, by sequentially performing initial access which starts from a terminal located close to the base station. In some embodiments, transmission power may be used to determine an MCS level and a transmission repetition count. Thereafter, upon receiving the initial access request, the terminal may transmit a preamble for random access to the base station, and may receive a response thereto.

In step 703, the terminal may receive control information for grant-free communication from the base station. Specifically, according to a first scenario, control information for grant-free communication may include at least one of sequence set information of a reference signal, an ID of the terminal in a cell, transmission repetition count information, MCS level information, subcarrier spacing information, grant-free resource region information, and subcarrier information allocated to the terminal in a grant-free resource region. In case of the first scenario, the terminal may transmit a reference signal and a data signal by using any subframes in a grant-free resource region. According to a second scenario, control information for grant-free communication may include at least one of sequence set information of a reference signal, an ID of the terminal in a cell, transmission repetition count information, MCS level information, subcarrier spacing information, grant-free resource region information, and subcarrier information allocated to the terminal in a grant-free resource region. In case of the second scenario, classification to a terminal group and a subframe group is based on a transmission repetition count, thereby decreasing complexity and increasing performance of a grant-free system. In some embodiments, the terminal may transmit a random access preamble to the base station. Accordingly, the terminal may receive a random access response from the base station. Thereafter, the terminal may transmit a Radio Resource Control (RRC) request to the base station. In response to the RRC request, the terminal may receive control information for grant-free communication from the base station.

In some embodiments, steps 701 and 703 of FIG. 7 may not be performed. For example, the steps 701 and 703 of FIG. 7 may be performed when the terminal first performs initial access to the base station, and upon completion of the initial access, the steps 701 and 703 of FIG. 7 may not be performed.

Figure 8:
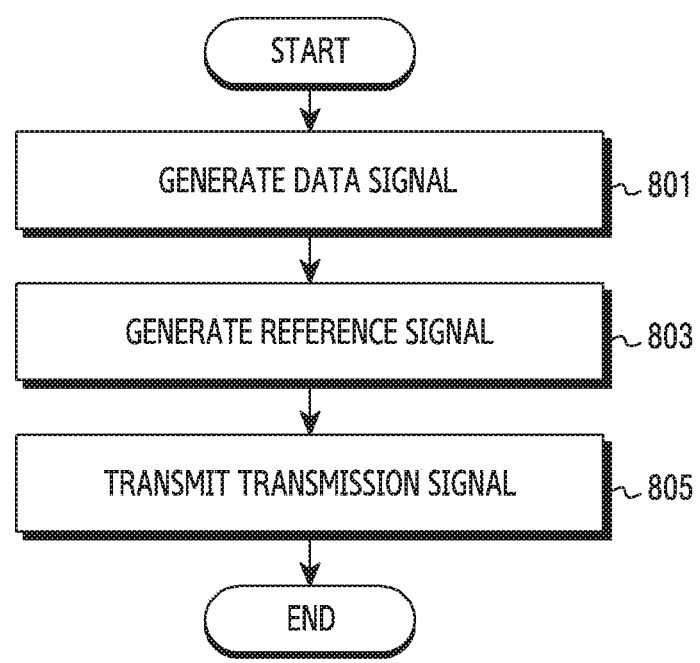
FIG. 8 is a flowchart of a terminal for transmitting a reference signal and a data signal in a wireless communication system in greater detail according to various embodiments of the present disclosure.

FIG. 8 is a flowchart of a terminal for transmitting a reference signal and a data signal in a wireless communication system in greater detail according to various embodiments of the present disclosure. A method of operating the terminal 120 is exemplified in FIG. 8.

Figure 9:
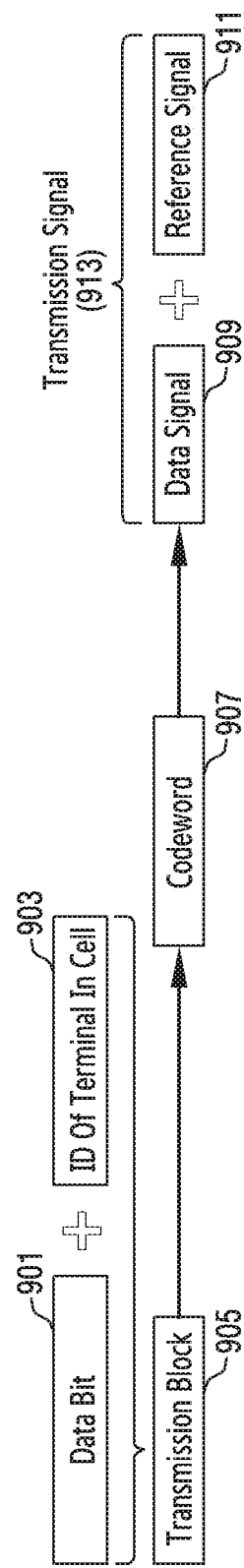
FIG. 9 illustrates an example of a transmission signal configuration in a wireless communication system according to various embodiments of the present disclosure.

Referring to FIG. 8, in step 801, the terminal generates a data signal. Specifically, referring to FIG. 9, the terminal may generate a scrambled codeword 907 by performing Cyclic Redundancy Check (CRC) inserting, channel coding (e.g., turbo coding), rate matching, and scrambling on a transmission block 905 including a data bit 901 and an ID 903 of the terminal in a cell, and may additionally generate a data signal 909 by performing modulation. Herein, the data signal 909 may correspond to a symbol level, and may be included in a transmission signal 913 together with a reference signal 911 generated in step 803 described below.

Figure 10A:
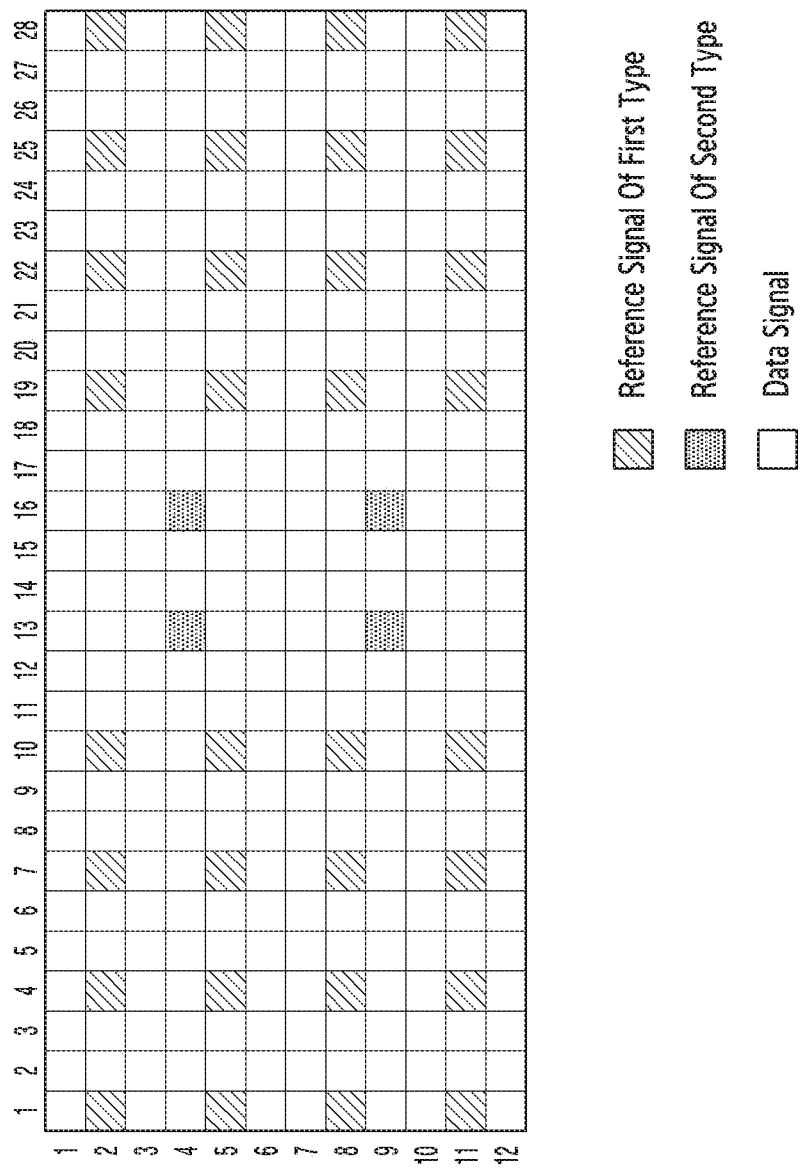
FIG. 10A to FIG. 10D illustrate an example of a reference signal deployment in a transmission signal on the basis of a first scenario in a wireless communication system according to various embodiments of the present disclosure.
Figure 10B:
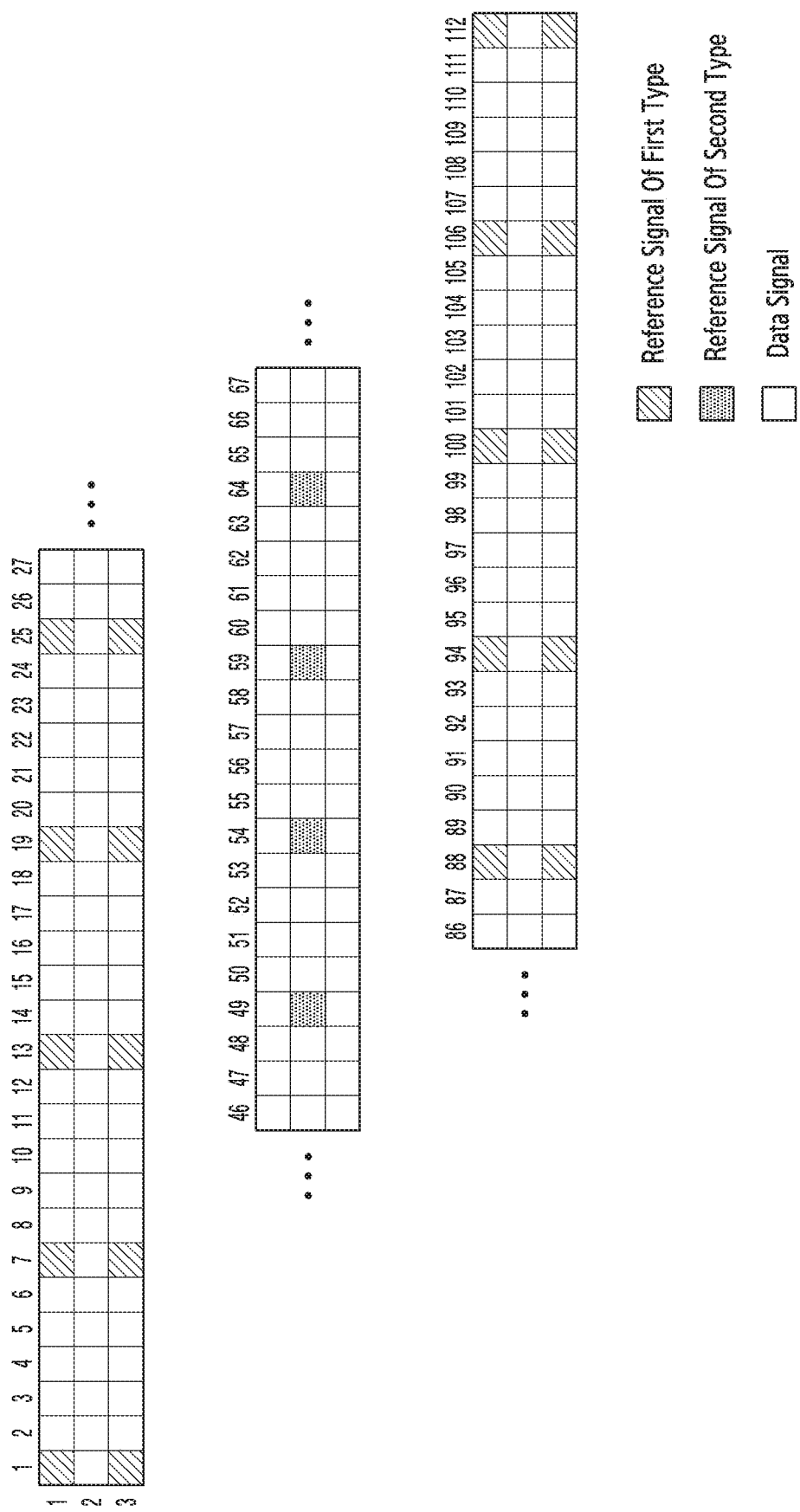
Figure 10C:
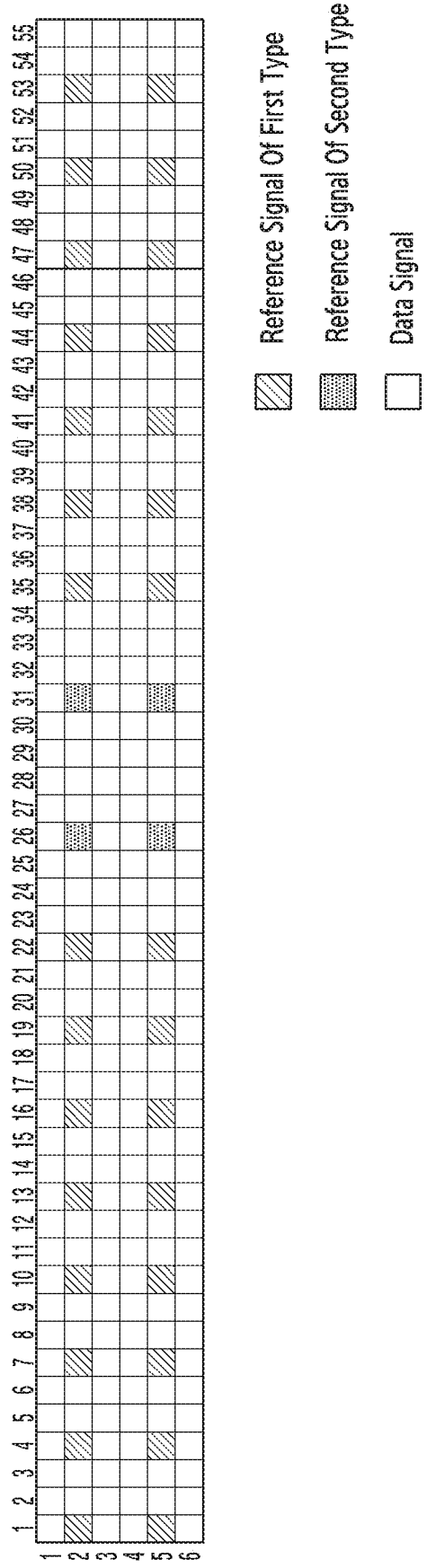
Figure 10D:
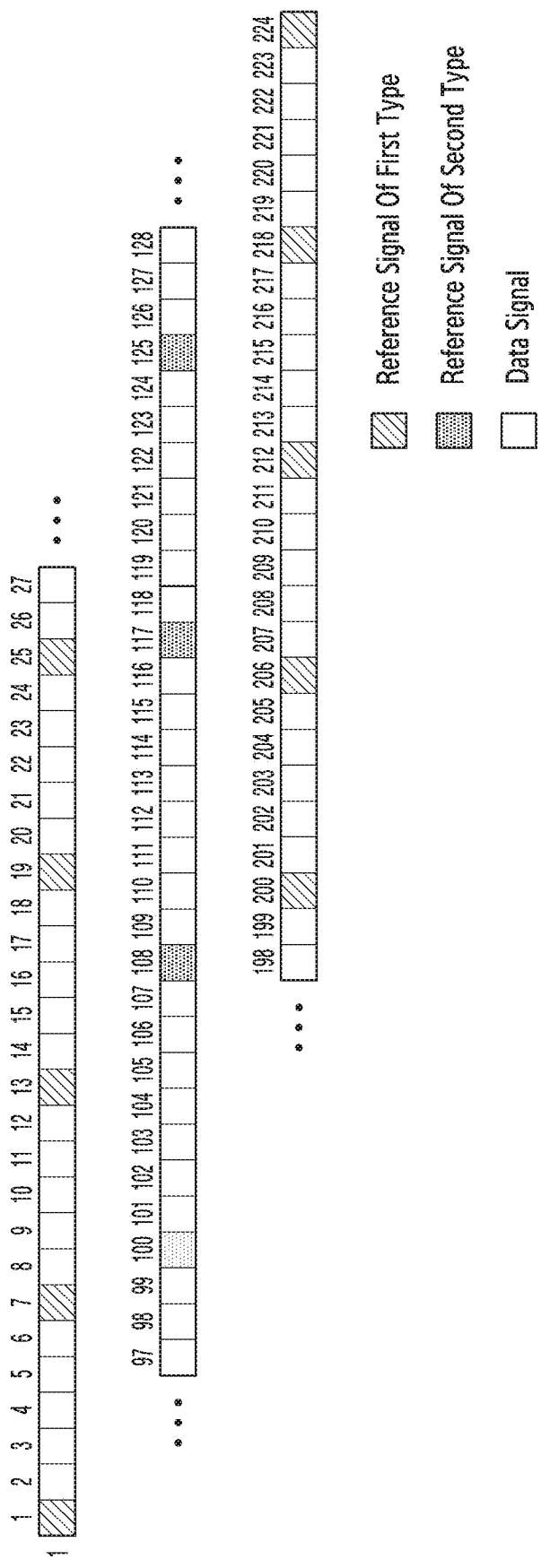

In step 803, the terminal generates a reference signal. Specifically, the terminal may generate the reference signal by using one of sequences included in sequence set information of the reference signal received from the base station. Herein, an index of the generated reference signal may be selected as a temporary ID of the terminal for grant-free communication. According to a first scenario, the reference signal may include at least one of a reference signal of a first type and a reference signal of a second type. Herein, the reference signal of the first type may be constructed of an orthogonal sequence. The orthogonal sequence may imply a sequence having low correlation. Due to an orthogonal feature of the reference signal of the first type, the base station may ensure high reference signal estimation performance, thereby resolving a high ambiguity problem and ensuring grant-free terminal group estimation performance. The reference signal of the second type may be constructed of a non-orthogonal sequence. The non-orthogonal sequence may imply a sequence having high correlation. The number of sequences of the reference signal of the second type is greater than a length of the sequence, thereby decreasing a probability that collision occurs in an index of a reference signal of each different terminal. For example, referring to FIG. 10A, a reference signal according to the first scenario may include two reference signals of the first type in which the number of sequences is 16 and a sequence length is 16, and one reference signal of the second type in which the number of sequences is 8 and a sequence length is 4. In this case, there are 2024(=16×16×8) types of an index of a reference signal that can be selected by the terminal. When 5 or less terminals can simultaneously transmit a reference signal and data, a probability that collision occurs in an index of a reference signal of each terminal may be less than or equal to $10^{-2}$. For another example, referring to FIG. 10B, when the number of subcarriers is 3 and subcarrier spacing is 15 Hz, the reference signal according to the first scenario may include two reference signals in which the number of sequences is 16 and a sequence length is 16, and one reference signal of the second type in which the number of sequences is 8 and a sequence length is 4. Referring to FIG. 10C, when the number of subcarriers is 6 and subcarrier spacing is 15 Hz, the reference signal according to the first scenario may include two reference signals of the first type in which the number of sequences is 16 and a sequence length is 16, and one reference signal of which the number of sequences is 8 and a sequence length is 4. Referring to FIG. 10D, when the number of subcarriers is 1 and subcarrier spacing is 3.75 Hz or 15 Hz, the reference signal according to the first scenario may include two reference signals of the first type in which the number of sequences is 5 and a sequence length is 5, and one reference signal of which the number of sequences is 8 and a sequence length is 4.

Figure 10E:
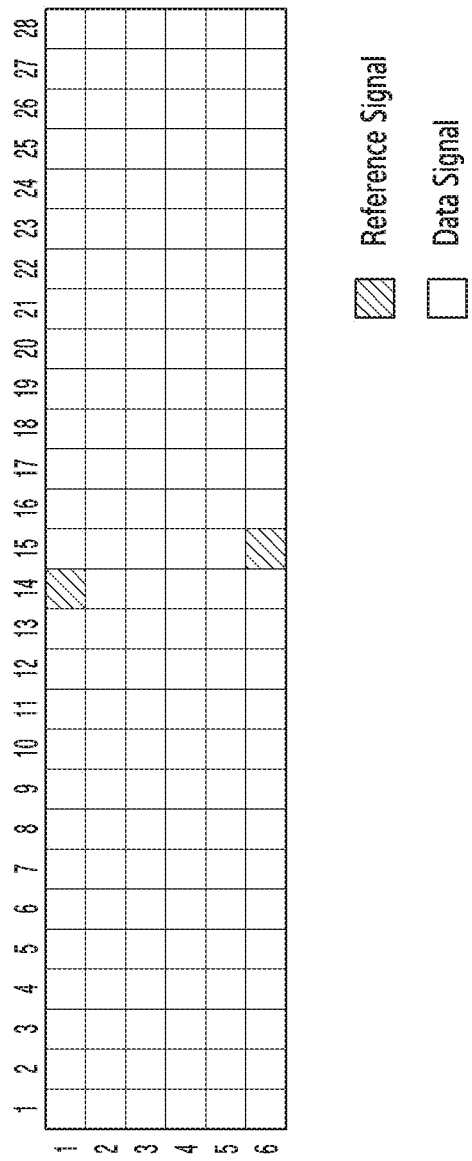
FIG. 10E illustrates an example of a reference signal deployment in a transmission signal on the basis of a second scenario in a wireless communication system according to various embodiments of the present disclosure.

According to the second scenario, an index of a reference signal is not used, and when decoding is performed using an ICA scheme, there is no need to resolve a permutation ambiguity problem. Therefore, the reference signal is constructed with a sequence length short enough to resolve a phase ambiguity problem, thereby leading to a significantly small overhead. For example, referring to FIG. 10E, a reference signal according to the second scenario may include one reference signal of which a sequence length is 2. In this case, according to the second scenario, since the terminal is specified by using an ID of the terminal in a cell without having to use an index of a reference signal, there is no need to resolve the permutation ambiguity problem.

In step 805, the terminal transmits a transmission signal including a reference signal and a data signal to the base station (e.g., the base station 110). Specifically, according to the first scenario, the terminal may transmit the transmission signal by selecting any subframes on the basis of a transmission repetition count in a grant-free resource region. According to the second scenario, the terminal may transmit the transmission signal through a subframe group corresponding to the terminal in the grant-free resource region.

One of the great features of an mMTC system is to use transmission repetition for coverage extension. In this case, the mMTC system to which the ICA scheme is applied needs to properly configure an ICA execution region on a frequency-time resource to acquire a gain depending on transmission repetition. In this case, the ICA execution region for acquiring the gain depending on the transmission repetition must satisfy the following two conditions.

First, the grant-free terminal group must not be changed in a range in which the ICA scheme is executed. The ICA scheme is a scheme capable of observing a statistical feature of a reception signal to cancel an effect caused by a channel included therein. Accordingly, when the grant-free terminal group is changed as shown in Equation (6) below in the range in which the ICA scheme is executed, the statistical feature of the reception signal is changed since a channel is also changed. Therefore, the effect caused by the channel cannot be cancelled.

$$[y(1) \ \ldots \ y(n)] = H_1 \begin{bmatrix} x_1(1) & & x_1(n) \\ \vdots & \ldots & \vdots \\ x_{1k}(1) & & x_k(n) \end{bmatrix} \quad (6)$$

$$[y(1) \ \ldots \ y(n)] = \begin{bmatrix} H_1 \begin{bmatrix} x_1(1) & & x_1(n) \\ \vdots & \ldots & \vdots \\ x_{1k}(1) & & x_k(n) \end{bmatrix} H_2 \begin{bmatrix} x_1(m+1) & & x_1(n) \\ \vdots & \ldots & \vdots \\ x_l(m+1) & & x_l(n) \end{bmatrix} \end{bmatrix}$$

Herein, x denotes a transmission signal, H denotes a channel, and y denotes a reception signal.

Secondly, performance of the ICA scheme is improved when the ICA execution region is wide. Since the ICA scheme is a scheme executed based on statistical information of a reception signal, a sample statistical value close to a theoretical statistic value can be used when using more reception signal samples. In addition, there may be an advantage in that an influence caused by noise can be cancelled when more reception signal samples are used. Combining the aforementioned two conditions, it can be seen that the region in which the ICA scheme is executed must be determined to be as large as possible within a range in which the grant-free terminal group is not changed.

Accordingly, the following descriptions include a detailed process of determining a grant-free terminal group and a detailed process of performing decoding by adoptively determining an ICA execution region according to various embodiments of the present disclosure.

Figure 11A:
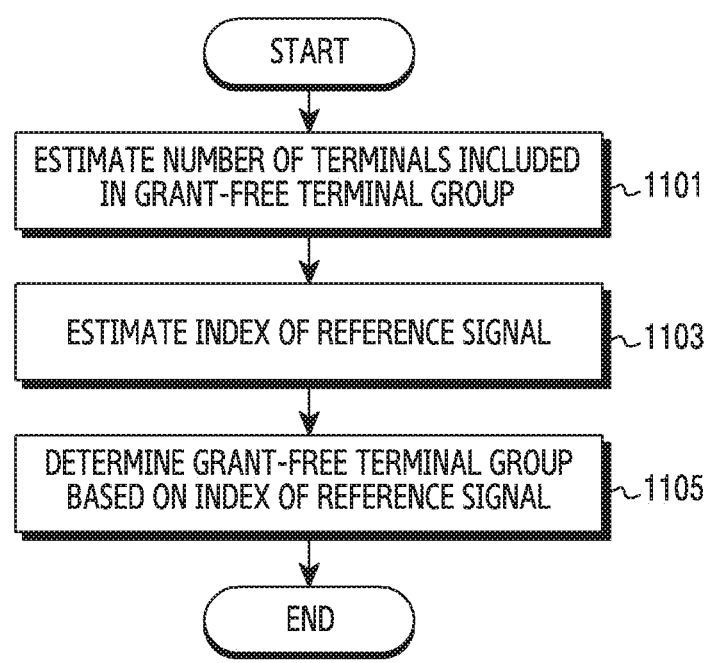
FIG. 11A is a flowchart of a base station for determining a grant-free terminal group on the basis of a first scenario in a wireless communication system in greater detail according to various embodiments of the present disclosure.

FIG. 11A is a flowchart of a base station for determining a grant-free terminal group on the basis of a first scenario in a wireless communication system in greater detail according to various embodiments of the present disclosure. A method of operating the base station 110 is exemplified in FIG. 11A.

Figure 12:
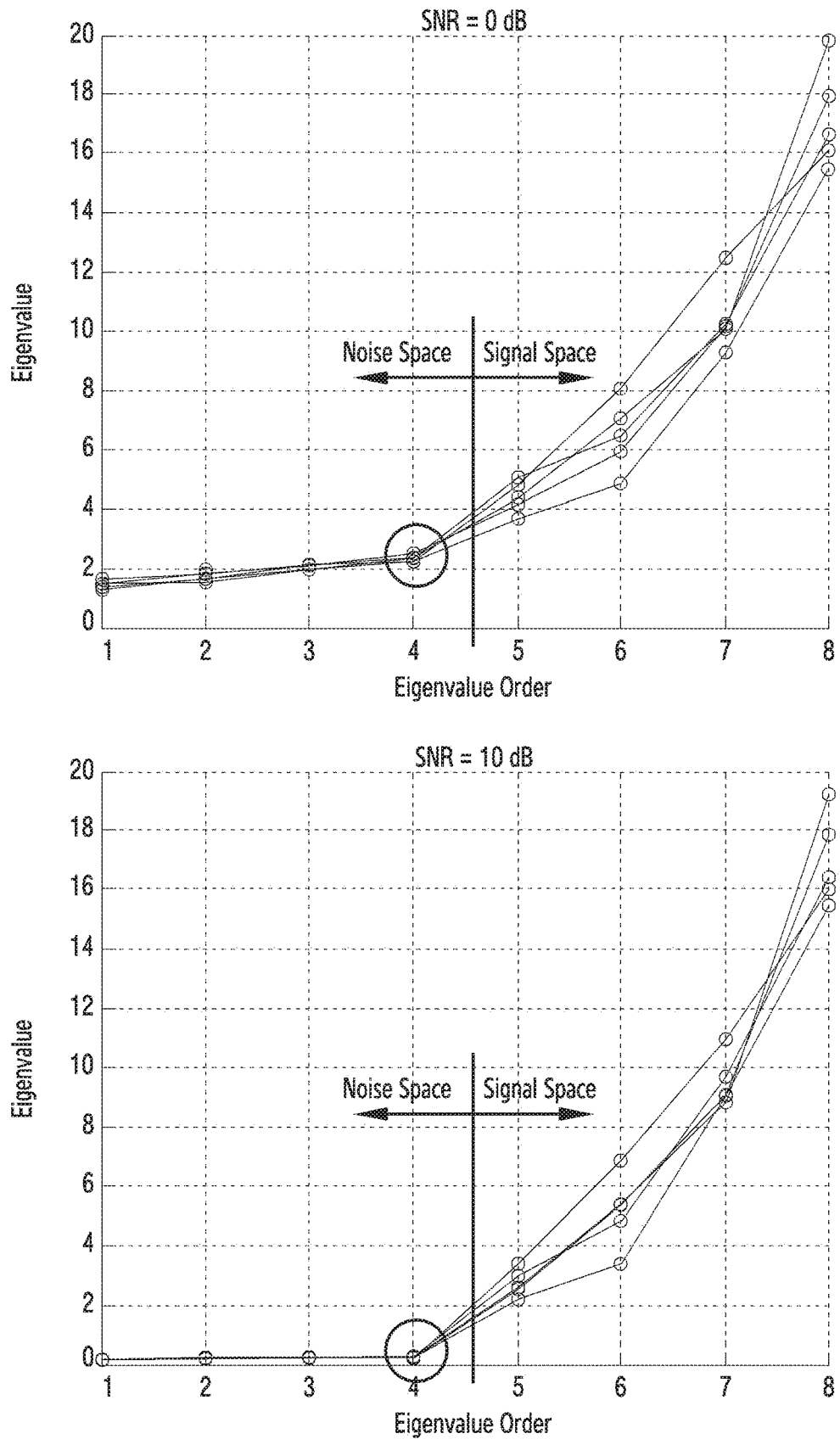
FIG. 12 is a graph for estimating the number of terminals included in a grant-free terminal group in a wireless communication system according to various embodiments of the present disclosure.

Referring to FIG. 11A, in step 1101, the base station measures the number of terminals included in a grant-free terminal group in each subframe. Specifically, the base station may measure the number of terminals included in the grant-free terminal group on the basis of an eigenvalue of a covariance matrix of a reception signal. This is a scheme using a feature in which a noise space and a signal space have different eigenvalues. That is, the base station may arrange an eigenvalue of each reception signal in order of a magnitude and thereafter discover a point at which the eigenvalue changes sharply, thereby identifying the noise space and the signal space. Accordingly, the base station can estimate how many signals are transmitted. Herein, the number of transmitted signals may imply the number of terminals included in the grant-free terminal group. For example, referring to FIG. 12, if a Signal to Noise Ratio (SNR) is 0 dB and 10 dB in a situation where the base station has 8 reception antennas and 4 transmission antennas, it can be seen that an eigenvalue changes sharply immediately after an eigenvalue order of 4. That is, an eigenvalue corresponding to the signal space with respect to the eigenvalue order of 4 is greater than an eigenvalue corresponding to the noise space, thereby identifying that the number of terminals included in the grant-free terminal group is 4.

In step 1103, the base station estimates an index of a reference signal. Specifically, the base station may separate a transmission signal from a reception signal by using an ICA scheme on the basis of the number of terminals included in the grant-free terminal group. Thereafter, the base station may extract the reference signal from the separated transmission signal to estimate an index of the reference signal through a sequence of the reference signal. Herein, the index of the reference signal may imply a temporary ID of each terminal included in the grant-free terminal group. A reason that the base station separates the transmission signal by using the ICA scheme after estimating the number of terminals included in the grant-free terminal group without considering correlation directly in the reception signal to estimate the index of the reference signal may be to incase correlation performance by considering correlation after separating the transmission signal to prevent the indices of the reference signals from being mixed to each other.

In step 1105, the base station determines the grant-free terminal group on the basis of the index of the reference signal. That is, the base station may determine the grant-free terminal group by using the index of the reference signal as a temporary ID of the terminal without estimating an ID of the terminal in a cell.

Figure 11B:
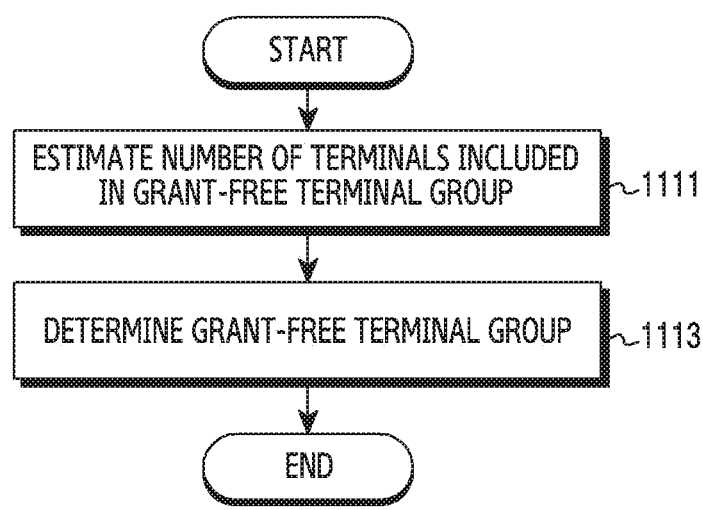
FIG. 11B is a flowchart of a base station for determining a grant-free terminal group on the basis of a second scenario in a wireless communication system in greater detail according to various embodiments of the present disclosure.

FIG. 11B is a flowchart of a base station for determining a grant-free terminal group on the basis of a second scenario in a wireless communication system in greater detail according to various embodiments of the present disclosure. A method of operating the base station 110 is exemplified in FIG. 11B.

Referring to FIG. 11B, in step 1111, the base station estimates the number of terminals included in a grant-free terminal group. Specifically, the base station may measure the number of terminals included in the grant-free terminal group on the basis of an eigenvalue of a covariance matrix of a reception signal. This is a scheme using a feature in which a noise space and a signal space have different eigenvalues. That is, the base station may arrange an eigenvalue of each reception signal in order of a magnitude and thereafter discover a point at which the eigenvalue changes sharply, thereby identifying the noise space and the signal space. Accordingly, the base station can estimate how many signals are transmitted. Herein, the number of transmitted signals may imply the number of terminals included in the grant-free terminal group. In some embodiments, step 1111 may be omitted.

In step 1113, the base station may determine the grant-free terminal group for each subframe group. Specifically, since an index of a reference signal is not used as a temporary ID of the terminal according to a second scenario, the base station may determine the grant-free terminal group by using an ID of the terminal in a cell, included in a transmission block, after being subjected to descrambling, rate recovering, channel decoding, and CRC checking. Herein, the grant-free terminal group may be the same as a terminal group grouped by the base station.

Figure 13A:
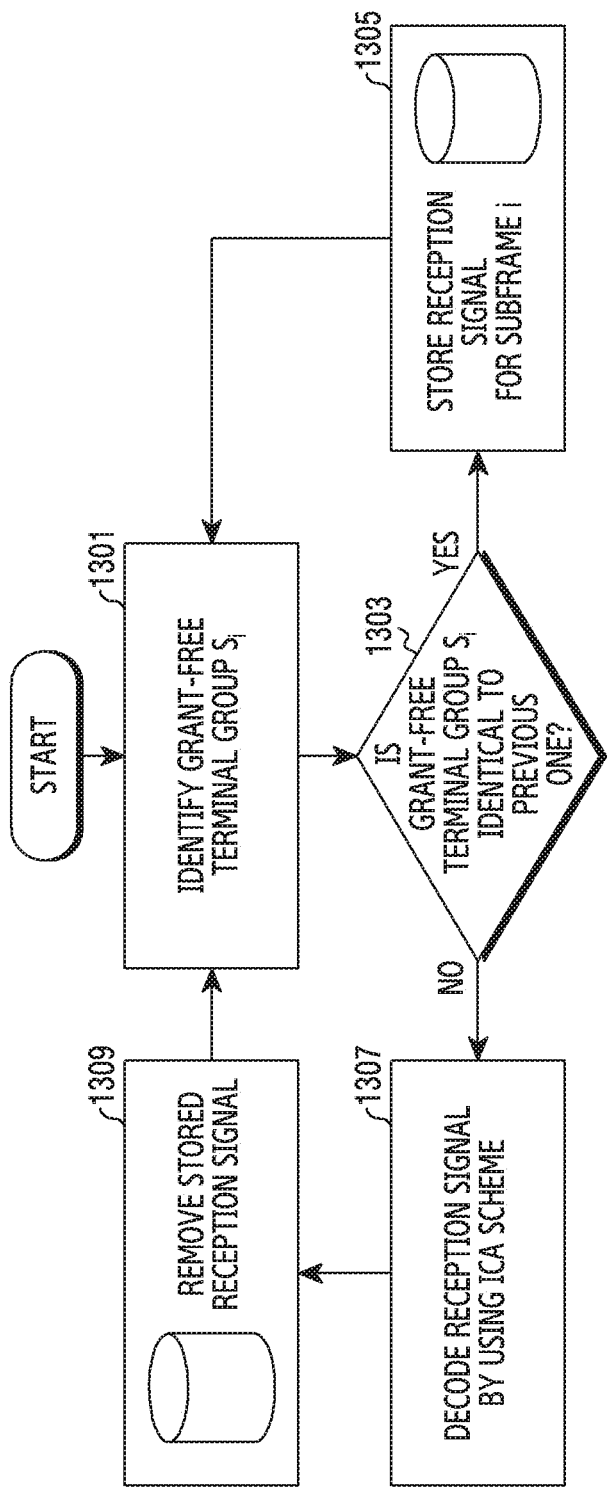
FIG. 13A is a flowchart of a base station for determining an ICA execution region to decode a reception signal on the basis of a first scenario in a wireless communication system in greater detail according to various embodiments of the present disclosure.

FIG. 13A is a flowchart of a base station for determining an ICA execution region to decode a reception signal on the basis of a first scenario in a wireless communication system in greater detail according to various embodiments of the present disclosure. A method of operating the base station 110 is exemplified in FIG. 13A.

Figure 14:
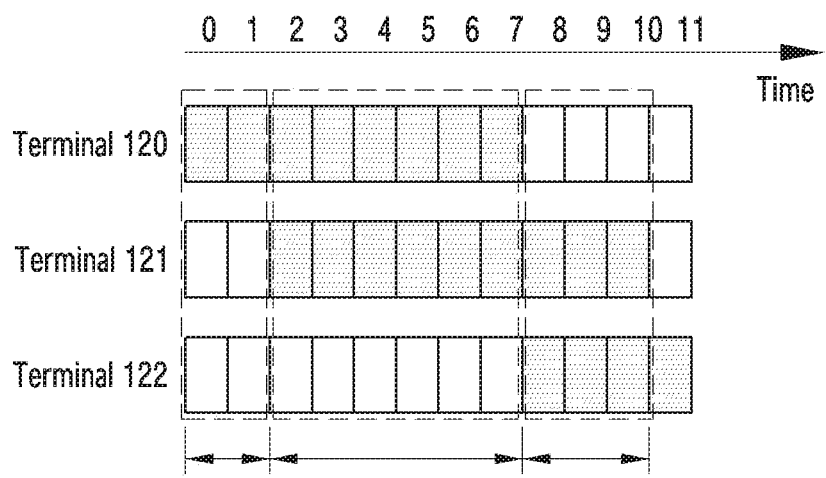
FIG. 14 illustrates an example of decoding a reception signal for an ICA execution region on the basis of a second scenario in a wireless communication system according to various embodiments of the present disclosure.
Figure 14:
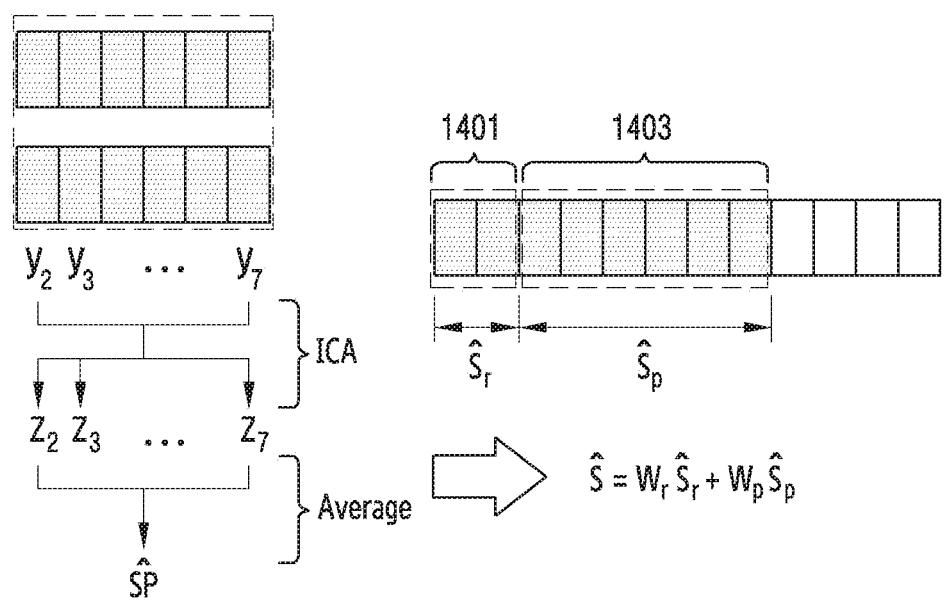

Referring to FIG. 13A, in step S1301, the base station identifies a grant-free terminal group $s_i$ for a subframe i. That is, the base station may identify terminals included in the grant-free terminal group $s_i$ by using an index of a reference signal used as a temporary ID of each terminal. For example, referring to FIG. 14, the base station may identify the terminals 120 and 121 included in a grant-free terminal group $s_7$ for a subframe 7.

In step 1303, the base station uses an index of a reference signal to determine whether the grant-free terminal group $s_i$ for a subframe i is the same as a grant-free terminal group $s_{i-1}$ for a previous subframe i−1. For example, the base station may determine whether terminals included in the grant-free terminal group $s_7$ for the subframe 7 is the same as terminals included in a grant-free terminal group $s_6$ for a subframe 6.

If the grant-free terminal group $s_i$ for the subframe i is the same as the grant-free terminal group $s_{i-1}$ for the previous subframe i−1, in step 1305, the base station stores a reception signal $y_i$ received through the subframe i in a storage unit (e.g., the storage unit 330). For example, referring to FIG. 14, if terminals (e.g., the terminal 120, the terminal 121) included in the grant-free terminal group $s_7$ for the subframe 7 are the same as terminals (e.g., the terminal 120, the terminal 121) included in the grant-free terminal group $s_6$ for the subframe 6, the base station may store a reception signal $y_7$ received through the subframe 7. Thereafter, the base station performs step 1301 for a next subframe (e.g., a subframe 8).

On the other hand, if the grant-free terminal group $s_i$ for the subframe i is the same as the grant-free terminal group $s_{i-1}$ for the previous subframe i−1, in step 1307, the base station uses the ICA scheme to decode the stored reception signals, and estimates a transmission signal by taking an average value of the decoded signals. That is, the base station may determine at least one subframe corresponding to a case where the grant-free terminal group is constantly maintained as an ICA execution region, decode reception signals for the ICA execution region, and estimate a transmission signal by taking an average value of the decoded signals. For example, referring to FIG. 14, if terminals (e.g., the terminal 120, the terminal 121) included in the grant-free terminal group $s_8$ for the subframe 8 are not the same as terminals (e.g., the terminal 120, the terminal 121) included in the grant-free terminal group $s_7$ for the subframe 7, the base station may determine the subframes 2 to 7 as the ICA execution region, decode reception signals $y_2, y_3, \ldots, y_7$ for the ICA execution region, and estimate a transmission signals by taking an average value of the decoded signals $z_2, z_3, \ldots, z_7$. In some embodiments, if a repeatedly received reception signal is divided into a plurality of ICA execution regions other than one ICA execution region, a transmission signal estimated in each ICA execution region may be subjected to weighted sum to estimate a final transmission signal. In this case, a weight may be determine according to a length of the ICA execution region and the number of terminals corresponding to the ICA execution region. For example, referring to FIG. 14, when a reception signal received from the terminal 120 is repeatedly received by being divided into an ICA execution region 1401 and an ICA execution region 1403, a final transmission signals may be estimated by Equation (7) below.

$$\hat{s} = w_r \hat{s}_r + w_p \hat{s}_p \qquad (7)$$

$\hat{s}$ denotes a final transmission signal, $\hat{s}_r$ denotes a transmission signal decoded from the ICA execution region 1401, $\hat{s}_p$ denotes a transmission signal decoded from the ICA execution region 1403, $w_r$ denotes a weight for the ICA execution region 1401, and $w_p$ denotes a weight for the ICA execution region 1403. For example, $w_r$ may be determined to a length 2 of the ICA execution region 1401, and $w_p$ may be determined to a length 6 of the ICA execution region 1403. For another example, $w_r$ may be determined to 1 which is the number of terminals (i.e., the terminal 120) corresponding to the ICA execution region 1401, and $w_p$ may be determined to 2 which is the number of terminals (e.g., the terminal 120, the terminal 121) corresponding to the ICA execution region 1403.

In step 1309, the base station removes the reception signal stored in the storage unit. That is, since the grant-free terminal group has changed, the base station may remove the reception signal stored in the storage unit in order to determine an ICA execution region for a next grant-free terminal group.

Figure 13B:
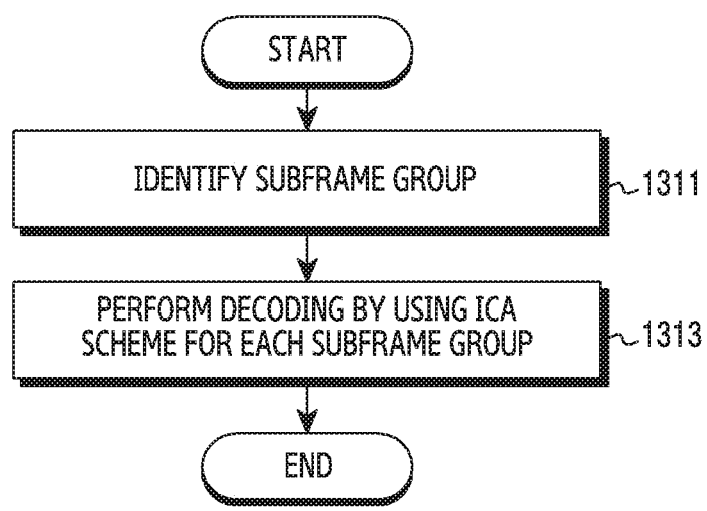
FIG. 13B is a flowchart of a base station for decoding a reception signal by determining an ICA execution region on the basis of a second scenario in a wireless communication system according to various embodiments of the present disclosure.

FIG. 13B is a flowchart of a base station for decoding a reception signal by determining an ICA execution region on the basis of a second scenario in a wireless communication system according to various embodiments of the present disclosure. A method of operating the base station 110 is exemplified in FIG. 13A.

Referring to FIG. 13B, in step 1311, the base station identifies a subframe group. Herein, the subframe group may include at least one subframe allocated to each terminal group in the grant-free resource region. That is, the base station may determine the subframe group as the ICA execution region.

In step 1313, the base station decodes a reception signal by using the ICA scheme for each subframe group. Specifically, the base station may decode the reception signal by using the ICA scheme for each subframe group determined as the ICA execution region.

As described above, methods for more effectively supporting a grant-free communication in each scenario have been described according to various embodiments of the present disclosure. This will be described below from a perspective of signaling of a terminal and a base station with reference to FIG. 15A and FIG. 15B.

Figure 15A:
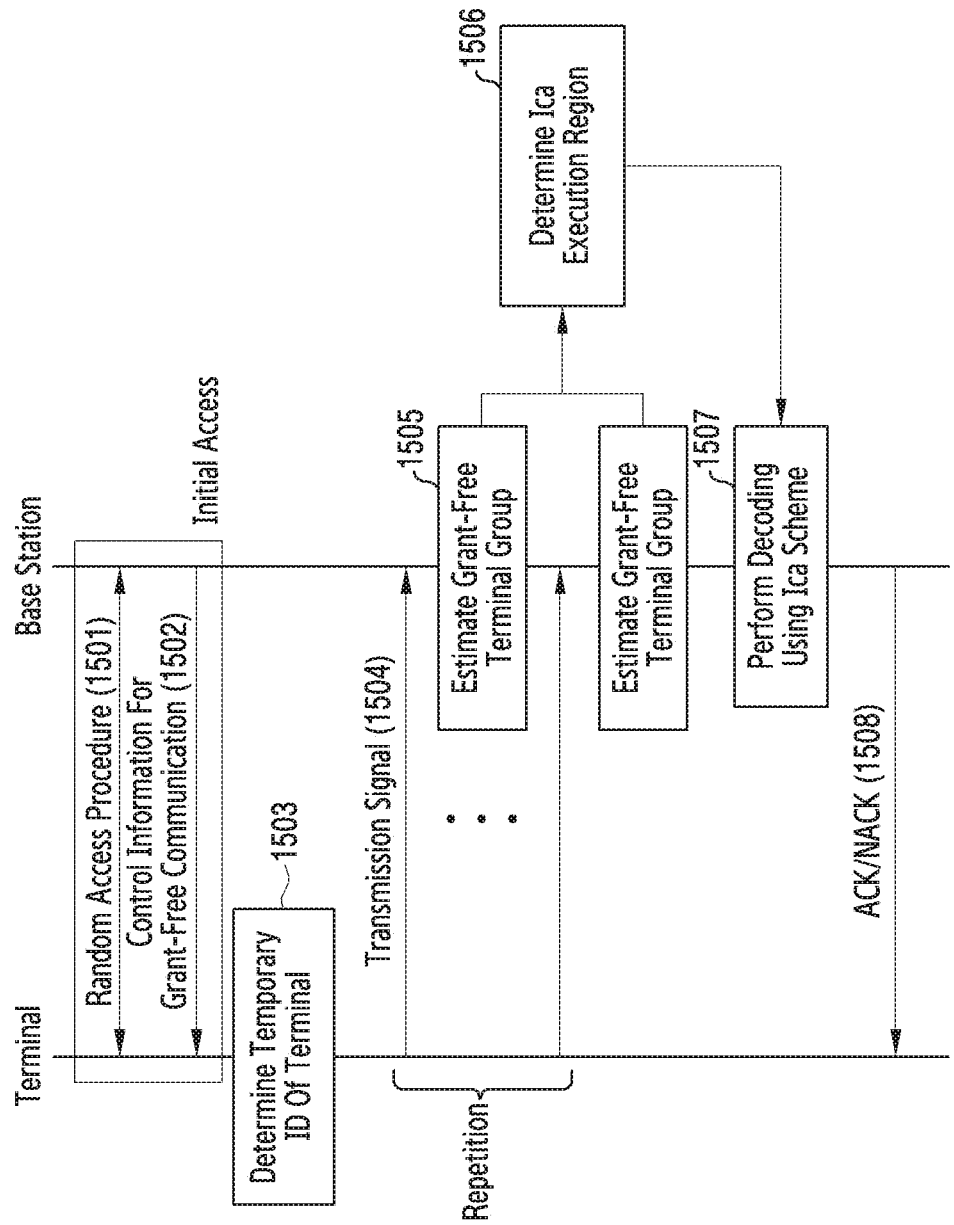
FIG. 15A illustrates signal exchange between a terminal and a base station on the basis of a first scenario in a wireless communication system according to various embodiments of the present disclosure.

FIG. 15A illustrates signal exchange between a terminal and a base station on the basis of a first scenario in a wireless communication system according to various embodiments of the present disclosure. Signal exchange between the terminal 120 and the base station 110 is exemplified in FIG. 15A.

Referring to FIG. 15A, in step 1501, the terminal performs a random access procedure with the base station. Specifically, the base station may broadcast an initial access request while gradually increasing transmission power. Thereafter, upon receiving the initial access request, the terminal may transmit a preamble for random access, and may receive a response thereof. Step 701 may be performed when the terminal first performs initial access to the base station. Upon completion of the initial access, step 1501 may be omitted.

In step 1502, the terminal receives control information for grant-free communication from the base station. That is, the terminal may receive parameters for grant-free communication, sequence set information of a reference signal, and grant-free resource region information from the base station.

In step 1503, the terminal selects a temporary ID of the terminal for grant-free communication. Herein, the temporary ID of the terminal may imply an index of a reference signal generated by using at least one of sequences included in sequence set information of the reference signal.

In step 1504, the terminal repeatedly transmits a transmission signal including a reference signal and a data signal to the base station according to a transmission repetition count. Herein, the reference signal may include a reference signal of a first type in which the number of sequences is the same as a length of the sequence, and a reference signal of a second type in which the number of sequences is greater than a length of the sequence.

In step 1505, the base station estimates a grant-free terminal group. Herein, the grant-free terminal group may include at least one terminal which has transmitted a reference signal and a data signal simultaneously by using a specific subframe or specific subframe group in a grant-free resource region.

In step 1506, the base station determines an ICA execution region. That is, the base station may determine at least one subframe corresponding to a case where the grant-free terminal group is constantly maintained as the ICA execution region.

In step 1507, the base station decodes a reception signal by using the ICA scheme. The base station may decode the reception signal corresponding to the ICA execution region.

In step 1508, the base station transmits ACKnowledgement (ACK) or Negative ACKnowledgement (NACK) to the terminal. That is, the base station may report to the terminal whether decoding is successful.

Figure 15B:
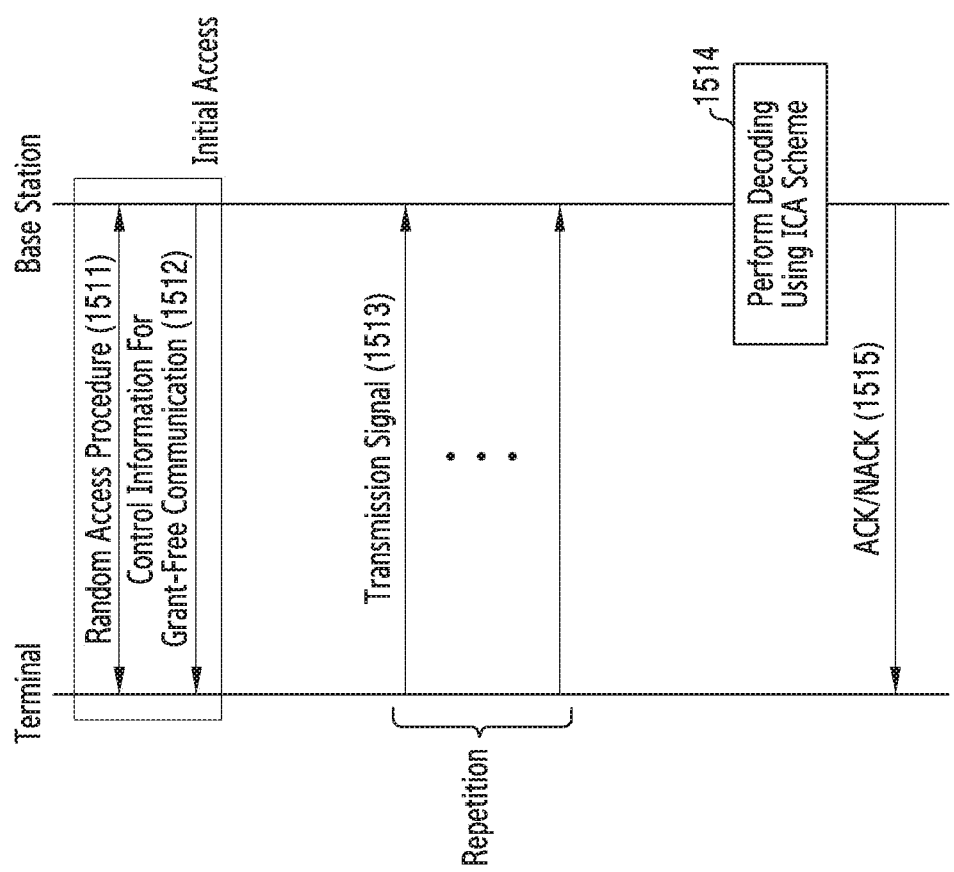
FIG. 15B illustrates signal exchange between a terminal and a base station on the basis of a second scenario in a wireless communication system according to various embodiments of the present disclosure.

FIG. 15B illustrates signal exchange between a terminal and a base station on the basis of a second scenario in a wireless communication system according to various embodiments of the present disclosure. Signal exchange between the terminal 120 and the base station 110 is exemplified in FIG. 15B.

Referring to FIG. 15B, in step 1511, the terminal performs a random access procedure with the base station. Specifically, the base station may broadcast an initial access request while gradually increasing transmission power. Thereafter, upon receiving the initial access request, the terminal may transmit a preamble for random access, and may receive a response thereof. Step 701 may be performed when the terminal first performs initial access to the base station. Upon completion of the initial access, step 1511 may be omitted.

In step 1512, the terminal receives control information for grant-free communication from the base station. That is, the terminal may receive parameters for grant-free communication, index information of a terminal group to which the terminal belongs, and subframe group information.

In step 1513, the terminal repeatedly transmits a transmission signal including a reference signal and a data signal to the base station according to a transmission repetition count. Herein, the reference signal may have a sequence length for determining an error of a sequence of a reference signal pre-agreed between the terminal and the base station and a sequence of a reference signal estimated by using the ICA scheme.

In step 1514, the base station decodes a reception signal by using the ICA scheme. More specifically, the base station may decode the reception signal for a subframe group by using the ICA scheme.

In step 1515, the base station transmits ACK or NACK to the terminal. That is, the base station may report to the terminal whether decoding is successful.

Figure 16:
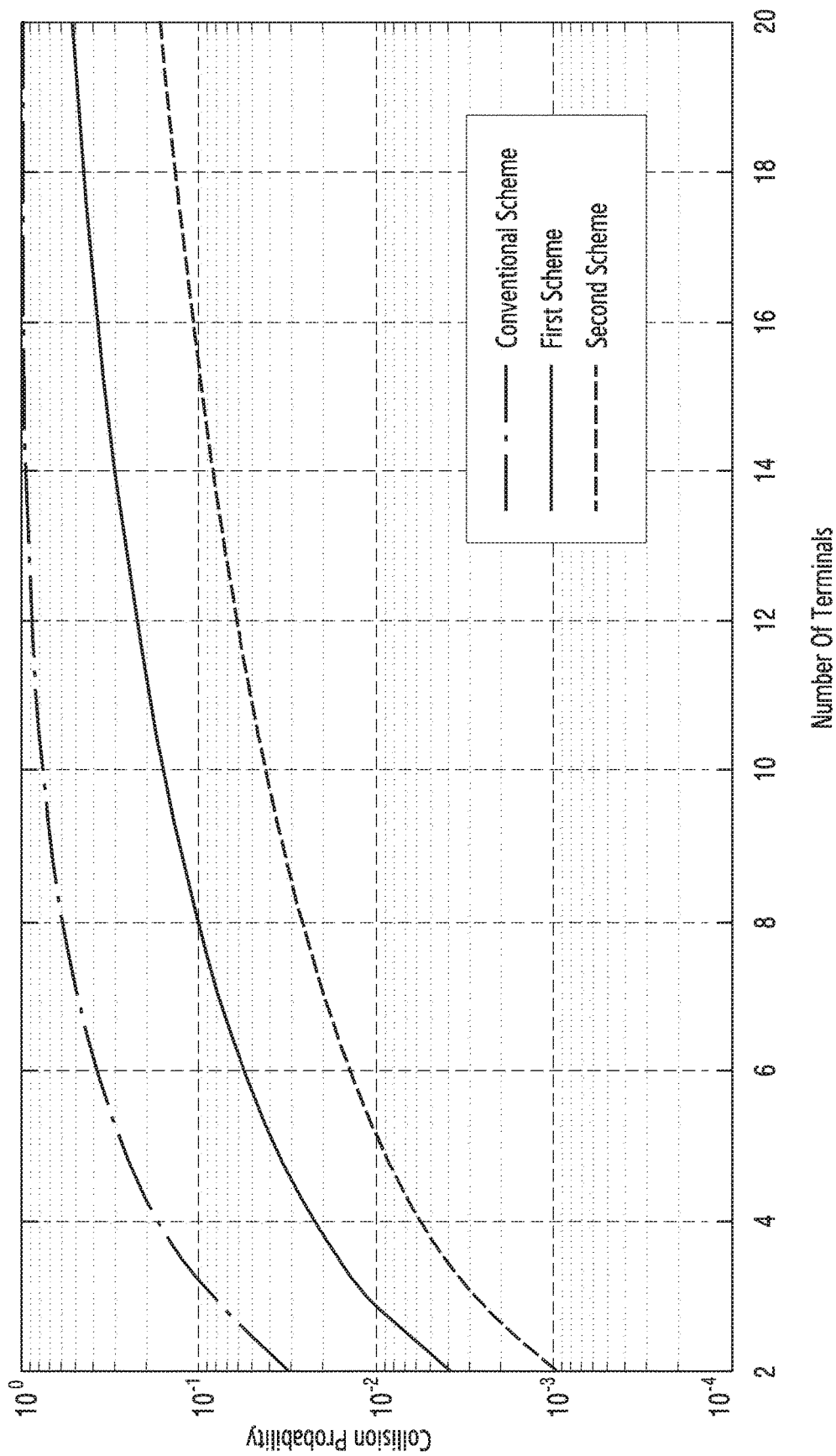
FIG. 16 is a graph illustrating a collision probability of a temporary ID on the basis of the number of terminals simultaneously performing grant-free access in a wireless communication system according to various embodiments of the present disclosure.

FIG. 16 is a graph illustrating a collision probability of a temporary ID on the basis of the number of terminals simultaneously performing grant-free access in a wireless communication system according to various embodiments of the present disclosure.

Referring to FIG. 16, the conventional scheme uses a Zadoff-Chu sequence in which a preamble used for random access in a Long Term Evolution (LTE) standard (e.g., NarrowBand-Internet of Things (NB-IoT)) has 64 sequences and a sequence length of 128. A first scheme according to various embodiments of the present disclosure uses two reference signals of a first type in which the number of sequences is 8 and a sequence length is 8 and one reference signal of a second type in which the number of sequences is 8 and a sequence length is 4 in a first scenario. A second scheme according to various embodiments of the present disclosure uses two reference signals of a first type in which the number of sequences is 16 and a sequence length is 16 and one reference signal of a second type in which the number of sequences is 8 and a sequence length is 4 in the first scenario. According to the graph, the first scheme and the second scheme have a lower temporary ID collision probability in comparison with the conventional method, and in addition, use a sequence with a lower length, thereby decreasing an overhead of a reference signal.

Figure 17:
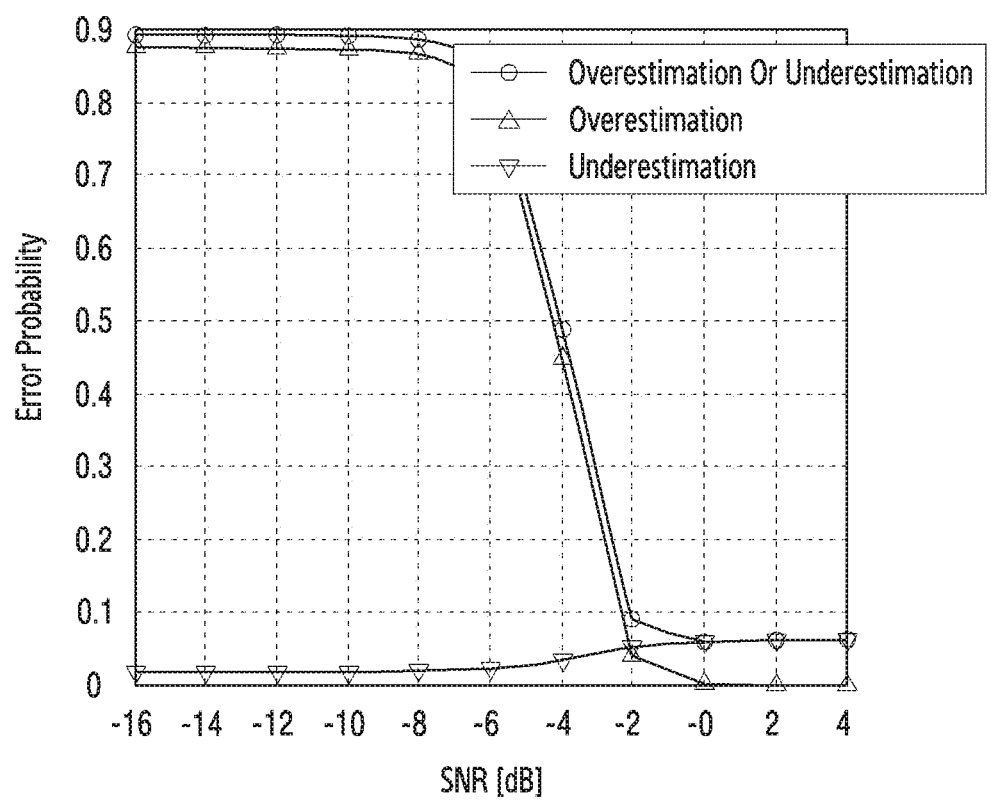
FIG. 17 is a graph illustrating performance of estimating the number of terminals included in a grant-free terminal group in a wireless communication system according to various embodiments of the present disclosure.

FIG. 17 is a graph illustrating performance of estimating the number of terminals included in a grant-free terminal group in a wireless communication system according to various embodiments of the present disclosure.

Referring to FIG. 17, a case where the number of terminals included in the grant-free terminal group is estimated may include a case where the number of terminals is underestimated, a case where the number of terminals is overestimated, and a case where the number of terminals is underestimated or overestimated, that is, the number of terminals is incorrectly estimated. In this case, according to the graph, it can be seen that decoding performance of a reception signal is high depending on a repetitive transmission gain according to various embodiments of the present disclosure even in a low SNR duration in which an estimated error probability is high.

Figure 18:
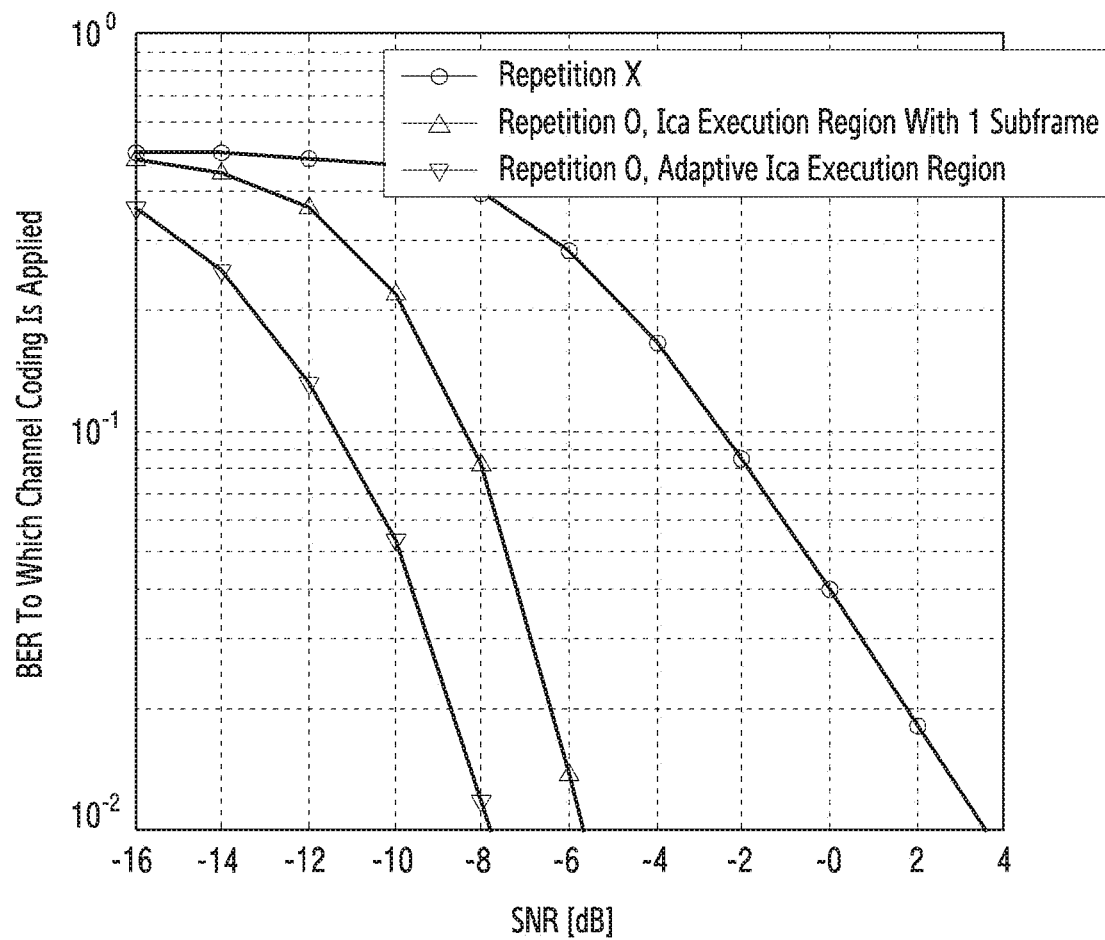
FIG. 18 is a graph illustrating Bit Error Rate (BER) performance in a wireless communication system according to various embodiments of the present disclosure.

FIG. 18 is a graph illustrating Bit Error Rate (BER) performance in a wireless communication system according to various embodiments of the present disclosure.

Referring to FIG. 18, it can be seen that a method of adaptively determining an ICA execution region while performing repetitive transmission according to various embodiments of the present disclosure has better BER performance than a method in which repetitive transmission is performed or a method in which an ICA scheme is applied in every subframe while performing repetitive transmission, that is, the method can obtain a gain based on repetitive transmission of an mMTC system. Herein, the BER performance may imply BER performance to which channel coding is applied.

Methods based on the embodiments disclosed in the claims and/or specification of the present disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the present disclosure.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have an access to a device for performing an embodiment of the present disclosure via an external port. In addition, an additional storage device on a communication network can have an access to the device for performing the embodiment of the present disclosure.

In the aforementioned specific embodiments of the present disclosure, a constitutional element included in the disclosure is expressed in a singular or plural form according to the specific example embodiment proposed herein. However, the singular or plural expression is selected properly for a situation proposed for the convenience of explanation, and thus the various embodiments of the present disclosure are not limited to a single or a plurality of constitutional elements. Therefore, a constitutional element expressed in a plural form can also be expressed in a singular form, or vice versa.

While the present disclosure has been shown and described with reference to certain preferred embodiments thereof, it will be understood by those skilled in the art that various changes in form and details may be made therein without departing from the spirit and scope of the present disclosure as defined by the appended claims. Therefore, the scope of the present disclosure is defined not by the detailed description thereof but by the appended claims, and all differences within equivalents of the scope will be construed as being included in the present disclosure.

What is claimed is:

1. An apparatus of a terminal in a wireless communication system, the apparatus comprising:
    at least one transceiver; and
    at least one processor operatively coupled to the at least one transceiver,
    wherein the at least one processor is configured to:
       receive control information for grant-free communication from a base station,
       generate a reference signal by using a sequence among sequences included in sequence set information for the reference signal included in the control information, and
       transmit the reference signal and a data signal to the base station by using transmission repetition count information and grant-free resource region information included in the control information,
    wherein the reference signal is used to identify an independent component analysis (ICA) region to decode the data signal without channel estimation, in case that a grant-free terminal group is not changed, and
    wherein the grant-free terminal group is associated with an index of the reference signal.

2. The apparatus of claim 1,
    wherein the at least one processor is further configured to:
       transmit a random access preamble to the base station,
       receive a random access response from the base station,
       transmit a radio resource control (RRC) request to the base station, and
       receive the control information for the grant-free communication in response to the RRC request, and
    wherein the control information includes at least one of sequence set information of the reference signal, an identification (ID) of the terminal in a cell, transmission repetition count information, modulation and coding scheme (MCS) information, subcarrier spacing information, subcarrier count information, or the grant-free resource region information.

3. The apparatus of claim 1,
    wherein the sequence of the reference signal includes a first sequence and a second sequence,
    wherein a length of the first sequence is equal to a number of first sequences, and
    wherein a length of the second sequence is greater than a number of second sequences.

4. The apparatus of claim 2,
    wherein the at least one processor is further configured to receive an initial access request from the base station and transmit an initial access response to the base station,
    wherein transmission power of the initial access request is used to determine the transmission repetition count and an MCS level for the terminal by the base station, and
    wherein the at least one processor is further configured to:
       in case that the base station decodes the data signal without channel estimation based on the identified ICA region, receive an acknowledgement (ACK) message from the base station, and
       in case that the base station does not decode the data signal, receive a negative acknowledgement (NACK) message from the base station.

5. An apparatus of a base station in a wireless communication system, the apparatus comprising:
    at least one transceiver; and
    at least one processor operatively coupled to the at least one transceiver,
    wherein the at least one processor is configured to:
       transmit control information for grant-free communication to a terminal,
       receive a reference signal and a data signal through a resource for the grant-free communication from the terminal,
       identify a grant-free terminal group based on an index of the reference signal,
       identify whether the grant-free terminal group is changed,
       in case that the grant-free terminal group is not changed, identify an independent component analysis (ICA) region based on the reference signal, and
       decode the data signal without channel estimation based on the identified ICA region, wherein the reference signal is generated by using a sequence among sequences included in sequence set information for the reference signal included in the control information, and wherein the terminal is identified based on the sequence by the base station.

6. The apparatus of claim 5, wherein the control information includes at least one of sequence set information of the reference signal, an identification (ID) of the terminal in a cell, transmission repetition count information, modulation and coding scheme (MCS) information, subcarrier spacing information, subcarrier count information, or grant-free resource region information.

7. The apparatus of claim 5, wherein the at least one processor is further configured to:

receive a random access preamble from the terminal, transmit a random access response to the terminal, receive a radio resource control (RRC) request from the terminal, and transmit the control information for the grant-free communication in response to the RRC request.

8. The apparatus of claim 5, wherein the sequence of the reference signal includes a first sequence and a second sequence, wherein a length of the first sequence is equal to a number of first sequences, and wherein a length of the second sequence is greater than a number of second sequences.

9. The apparatus of claim 6, wherein the at least one processor is further configured to:

receive an initial access response upon transmitting an initial access request to the terminal, determine the transmission repetition count and an MCS level for the terminal based on transmission power of the initial access request, in case that the base station decodes the data signal without channel estimation based on the identified ICA region, transmit an acknowledgement (ACK) message to the terminal, and in case that the base station does not decode the data signal, transmit a negative acknowledgement (NACK) message to the terminal.

10. The apparatus of claim 5, wherein, in order to identify the grant-free terminal group, the at least one processor is further configured to:

identify a number of terminals included in the grant-free terminal group in each subframe based on the reference signal, and identify the index of the reference signal based on the identified number of terminals.

11. A method performed by a terminal in a wireless communication system, the method comprising:

receiving control information for grant-free communication from a base station;

generating a reference signal by using a sequence among sequences included in sequence set information for the reference signal included in the control information; and transmitting the reference signal and a data signal to the base station by using transmission repetition count information and grant-free resource region information included in the control information, wherein the reference signal is used to identify an independent component analysis (ICA) region to decode the data signal without channel estimation, in case that a grant-free terminal group is not changed, and wherein the grant-free terminal group is associated with an index of the reference signal.

12. The method of claim 11, wherein the receiving of the control information for grant-free communication comprises:

transmitting a random access preamble to the base station, receiving a random access response from the base station, transmitting a radio resource control (RRC) request to the base station, and receiving the control information for the grant-free communication in response to the RRC request, and wherein the control information includes at least one of sequence set information of the reference signal, an identification (ID) of the terminal in a cell, transmission repetition count information, modulation and coding scheme (MCS) information, subcarrier spacing information, subcarrier count information, or the grant-free resource region information.

13. The method of claim 11, wherein the sequence of the reference signal includes a first sequence and a second sequence, wherein a length of the first sequence is equal to a number of first sequences, and wherein a length of the second sequence is greater than a number of second sequences.

14. The method of claim 12, further comprising:

receiving an initial access request from the base station;

transmitting an initial access response to the base station;

in case that the base station decodes the data signal without channel estimation based on the identified ICA region, receiving an acknowledgement (ACK) message from the base station; and in case that the base station does not decode the data signal, receiving a negative acknowledgement (NACK) message from the base station, wherein transmission power of the initial access request is used to determine the transmission repetition count and an MCS level for the terminal by the base station.

15. A method performed by a base station in a wireless communication system, the method comprising:

transmitting control information for grant-free communication to a terminal;

receiving a reference signal and a data signal through a resource for the grant-free communication from the terminal;

identifying a grant-free terminal group based on an index of the reference signal;

identifying whether the grant-free terminal group is changed;

in case that the grant-free terminal group is not changed, identifying an independent component analysis (ICA) region based on the reference signal; and decoding the data signal without channel estimation based on the identified ICA region, wherein the reference signal is generated by using a sequence among sequences included in sequence set information for the reference signal included in the control information, and wherein the terminal is identified based on the sequence by the base station.

16. The method of claim 15, wherein the control information includes at least one of sequence set information of the reference signal, an identification (ID) of the terminal in a cell, transmission repetition count information, modulation and coding scheme (MCS) information, subcarrier spacing information, subcarrier count information, or grant-free resource region information.

17. The method of claim 15, further comprising:
receiving a random access preamble from the terminal;
transmitting a random access response to the terminal;
receiving a radio resource control (RRC) request from the terminal; and
transmitting the control information for the grant-free communication in response to the RRC request.

18. The method of claim 15,
wherein the sequence of the reference signal includes a first sequence and a second sequence,
wherein a length of the first sequence is equal to a number of first sequences, and
wherein a length of the second sequence is greater than a number of second sequences.

19. The method of claim 16, further comprising
receiving an initial access response upon transmitting an initial access request to the terminal;
determining the transmission repetition count and an MCS level for the terminal based on transmission power of the initial access request;
in case that the base station decodes the data signal without channel estimation based on the identified ICA region, transmitting an acknowledgement (ACK) message to the terminal; and
in case that the base station does not decode the data signal, transmitting a negative acknowledgement (NACK) message to the terminal.

20. The method of claim 15, wherein the identifying of the grant-free terminal group comprises:
identifying a number of terminals included in the grant-free terminal group in each subframe based on the reference signal; and
identifying the index of the reference signal based on the identified number of terminals.

* * * * *